(12) United States Patent
Mohan et al.

(10) Patent No.: US 11,498,476 B2
(45) Date of Patent: Nov. 15, 2022

(54) SYSTEM FOR CONTROLLING HEADLAMP BEAM OF A VEHICLE AND A METHOD THEREOF

(71) Applicant: SAINT SITA RAM INNOVATION LAB PRIVATE LIMITED, Punjab (IN)

(72) Inventors: Lalit Mohan, Punjab (IN); Sabita Sharma, Punjab (IN)

(73) Assignee: Saint Sita Ram Innovation Lab Private Ltd, Bathinda (IN)

( * ) Notice: Subject to any disclaimer, the term of this patent is extended or adjusted under 35 U.S.C. 154(b) by 425 days.

(21) Appl. No.: 16/790,800

(22) Filed: Feb. 14, 2020

(65) Prior Publication Data
US 2020/0180500 A1 Jun. 11, 2020

Related U.S. Application Data

(63) Continuation of application No. PCT/IB2018/057683, filed on Oct. 3, 2018.

(30) Foreign Application Priority Data

Aug. 17, 2017 (IN) .............................. 201711029230

(51) Int. Cl.
*B60Q 1/06* (2006.01)
*H05B 47/19* (2020.01)
(Continued)

(52) U.S. Cl.
CPC ............ *B60Q 1/06* (2013.01); *B60R 11/0229* (2013.01); *G01S 19/13* (2013.01); *H05B 47/19* (2020.01)

(58) Field of Classification Search
CPC .... B60Q 1/06; B60Q 1/143; B60Q 2300/112; B60Q 2300/32; B60Q 2300/332;
(Continued)

(56) References Cited

U.S. PATENT DOCUMENTS

| 9,649,974 | B1 * | 5/2017 | Arumugasamy | ...... B60Q 1/143 |
| 2012/0019375 | A1 * | 1/2012 | Kataoka | ................. G08G 1/166 |
| | | | | 340/439 |

FOREIGN PATENT DOCUMENTS

| CN | 107878303 B | * | 11/2020 | ........... B60Q 1/0023 |
| EP | 1282916 B1 | | 11/2011 | |
| WO | WO-2015042806 A1 | * | 4/2015 | ........... G06F 3/0484 |

OTHER PUBLICATIONS

International Search Report of PCT Patent Application No. PCT/IB2018/057683 dated Dec. 13, 2018.

* cited by examiner

*Primary Examiner* — Farid Seyedvosoghi

(57) ABSTRACT

The present disclosure described herein, in general, relates to a system 500 for controlling headlamps of a vehicle. The system 500 may comprise a signal processing unit 509, a relay circuit 401, a switch 302 and a user device 407. The user device 407 comprises a GPS tracker 408-A, an output unit 409, a processor 408-B and a memory 408-C. The system comprises comparing one or more parameters with the predefined threshold value, notifying information based upon the one or more parameters, instructing the user to change the status of the headlamp using the switch 302 based upon the comparison of the one or more parameters with the predefined threshold value and controlling the status of the headlamps upon receiving command by the user based upon the instructions or automatically operating the relay circuit 401 based upon the received signals.

7 Claims, 24 Drawing Sheets

(51) Int. Cl.
*B60R 11/02* (2006.01)
*G01S 19/13* (2010.01)

(58) Field of Classification Search
CPC ... B60Q 2900/30; B60Q 9/00; B60R 11/0229; G01S 19/13; H05B 47/19
See application file for complete search history.

SYSTEM FOR CONTROLLING HEADLAMP BEAM OF A VEHICLE AND A METHOD THEREOF

CROSS-REFERENCE TO RELATED APPLICATIONS AND PRIORITY

The present application is a Continuation Application of a PCT application Number PCT/IB2018/057683 filed on Oct. 3, 2018 which claims priority from Application No. 201711029230 filed in India on Aug. 17, 2017, incorporated herein by a reference.

TECHNICAL FIELD

The present subject matter described herein, in general, relates to a system for controlling headlamp beam of a vehicle and a method thereof.

BACKGROUND

Automobiles use Headlamps for illumination of roads when running in dark. Headlamps have two beams i.e. "High" beam and "Low" beam. High beam position gives more illumination and gives light at upper part of the road ahead i.e. illumination of objects at height (say 3 meters) along with illumination of road. Low beam illuminates relatively lower height objects (say up to 1 meter). High beam has a disadvantage that it causes glare to other road user's i.e. pedestrian, cyclist, vehicle users and other road users. High beam glare causes damage to eyes of other road users and also leads to road accidents. So, use of "High Beam" is not allowed when you encounter other vehicles or other road users like pedestrian, cyclist, motorist, toll plaza employees etc. Use of high beam is restricted in certain specified geographical area irrespective of presence or absence of vehicles/persons.

Many countries challan vehicle drivers using "High Beam". So "High Beam" is allowed only on freeways where there are no other road users coming from opposite side or other areas/roads permitted by traffic authorities of the area. As the vehicle driver encounters other road users, driver is supposed to shift the beam from "High" to "Low".

A mechanical switch/lever is available near steering of car. This switch/lever has two positions "High" and "Low". Driver can use "High" position to keep the headlight beam in high position. Driver can use "Low" positioning switch/lever to keep the headlight beam in "Low Beam" position. A visual notification of the same is available on instrument cluster to indicate whether the vehicle beam is in "High" position or "Low" position.

Next improvement was in name of "Auto Dipper". Auto dipper is a device used to dip the beam from "High" to "Low" automatically i.e. without driver effort. Auto dipper uses light from vehicle coming from opposite direction to activate photo sensor (say LDR) which further operate the relay to switch on "Low" beam circuit of vehicle.

Further, high beam should be switched to low beam as and vehicle enters into area where use of high beam is restricted due to population density, road width, speed limit, toll plaza or any other rule by local transport authorities. Use of low beam is enforced by authorities to reduce headlamp's glare to road users which is one of the main causes of accidents at night. Auto dipper does not take care of the aspect i.e. operating in restricted area.

Major problem with auto dipper is that it is activated by headlight of vehicle from opposite direction. Auto dipper does not work when vehicle enters a populated area/restricted area and no vehicle is coming from opposite side. When a vehicle with auto dipper enters a turn on road, vehicle beam will remain in "High beam" position till it encounters another vehicle with its Headlamp in ON position. Even if it encounters another vehicle, the beam will temporarily shift to "Low" and will come back to "High" position as opposite vehicle crosses the given vehicle. So, again vehicle beam is in "High" position. This vehicle is bound to attract punishable action as it is in a town (i.e. populated area) and use of HIGH beam is punishable offence.

The legal requirement in most of the countries is that Headlight beam should be in "Low beam" position till vehicle moves in populated area (say a town) so that there is no inconvenience to other road users. So, vehicle drivers still use manual switch/lever to shift the beam from "High" to "Low" as they enter a populated area.

Secondly, drivers are sometimes not aware of local/regional law regarding restrictions on the use of "High beam" in given area. Sometimes, local traffic laws demand "LOW beam" when speed limit in restricted area is below certain value (say 60 km/hr) or road width is below certain value (say 30 feet) or under certain other rules/laws.

Auto dipper won't work if there is no vehicle with headlamps ON from opposite direction. Auto dipper does not give any notification to driver/user that they have entered or about to enter an area where use of "High beam" is restricted due to population density, width of road or speed limit or due some other reason mentioned in local traffic laws.

Headlight glare leads to three major problems. First, headlight glare causes temporary blinding effect to oncoming road users and leads to accidents at night. As per data, 18% of accidents in India at night are due to headlight glare. Second, long exposure of headlight glare to drivers causes fatigue which further leads to accidents and poor quality of life. Third, prolonged exposure of headlight glare for years leads to weakening of eyesight of road users forever.

So, the problem caused in all the above cases should be solved so that other road user's i.e. pedestrian, cyclist etc can be saved from bad effects of headlight glare in the area.

In view of the above, it can be concluded that there is a long-felt need to have a system and a method to give information to the driver/user that he has entered in the area where use of high beam is restricted, and he should switch over to low beam position. There is also a need to notify the user/driver about different parameters such as speed limit laws, traffic rules, geographical area etc. and instructing the user for switching/controlling headlamp of vehicle based upon such parameters. Further, there should be a provision to control the status of the headlamps automatically if the user fails to operate a switch manually.

SUMMARY

This summary is provided to introduce concepts related to a system for controlling headlamps of a vehicle and a method thereof and the concepts are further described in the detail description. This summary is not intended to identify essential features of the claimed subject matter nor it is intended to use in determining or limiting the scope of claimed subject matter.

In one implementation, the invention discloses a system for controlling headlamps of a vehicle. The system may comprise a signal processing unit, a relay circuit capable to perform action based on the signal from the signal processing unit, a switch and a user device. The user device may further comprise a Global Positioning System (GPS) tracker capable to receive signals, an output unit a processor and a memory coupled with the processor. The system may comprise comparing one or more parameters with the predefined threshold value based upon traffic management guidelines and motor vehicle guidelines associated with the received signals. The system may further comprise notifying information based upon the one or more parameters. Further, the system may comprise instructing the user to change the status of the headlamp using the switch based upon the comparison of the one or more parameters with the predefined threshold value. The system may further comprise controlling the status of the headlamps upon receiving command by the user based upon the instructions or automatically operating the relay circuit based upon the received signals.

In another implementation, the invention discloses a method for controlling headlamps of automobile. The method may comprise comparing, via a processor, one or more parameters with the predefined threshold value based upon traffic management guidelines and motor vehicle guidelines associated with the received signals. The method may further comprise notifying, via the processor, information based upon the one or more parameters. The method may comprise instructing, via the processor, the user to change the status of the headlamp using the switch based upon the comparison of the one or more parameters with the predefined threshold value. The method may further comprise controlling, via the processor, the status of the headlamps upon receiving command by the user based upon the instructions or automatically operating the relay circuit based upon the received signals.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Objective of the invention is to give audio/visual notification to a user that vehicle has entered into a restricted area where use of high beam is restricted due to population density, road width, toll plaza, speed limit or any other reason/instructions given by local authority. Another objective is to have a switching device which will switch a beam from high to low and vice versa if the user fails to take corrective action after the notification given to the user. Further another objective of the invention is to inform the user about presence of toll plaza and traffic as the traffic display boards mounted at heights along the road are not easily readable at night due to shifting of beam from high to low. Further, another objective of the invention is to inform the user about fine or charges dur to over speeding in an area, presence of blind spot in the area to warn the user and the like.

Figure 1:
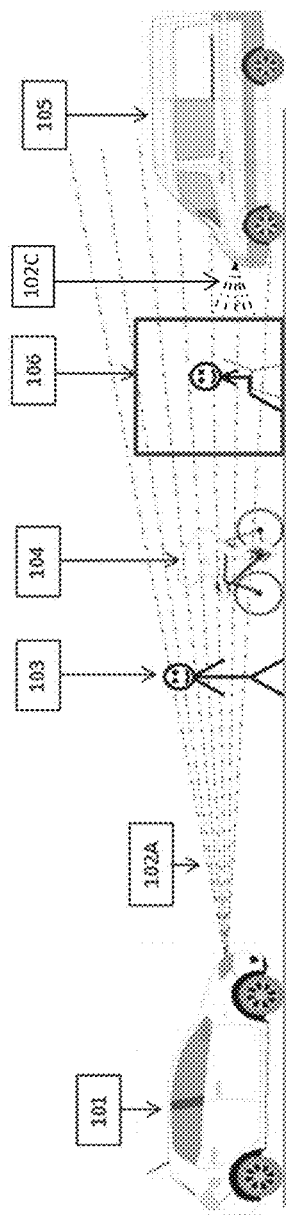
FIG. 1 illustrates a pictorial view 100 of glare caused by vehicle headlight to other individuals, in accordance with an embodiment of a present subject matter.

Referring to FIG. 1, illustrates a pictorial view 100 of glare caused by vehicle headlight to other individuals, in accordance with an embodiment of a present subject matter. A vehicle 101 is having its headlight beam 102A in "high" position. High position headlight beam may cause glare in eyes of users i.e. a pedestrian 103, a cyclist 104, other vehicle drivers 105, toll plaza person 106 sitting inside the operating room and other user present in a restricted geographical area. The restricted geographical area may be the area where use of high beam is not allowed as per local traffic laws/rules. E.g. high beam use restriction may be due to speed limits, road width, cars at toll plaza in same direction, municipal limits of a city/town or any other reason.

Figure 2:
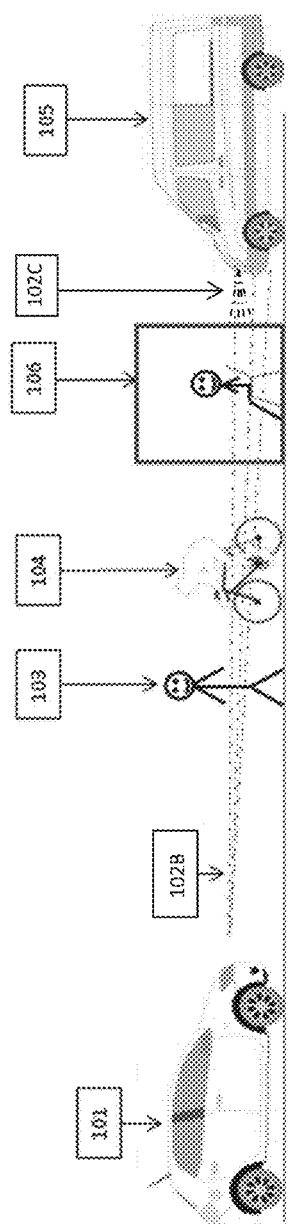
FIG. 2 illustrates a pictorial view 200 of headlight beam in "LOW" position with reduced light in the eyes of other individuals, in accordance with an embodiment of a present subject matter.

Referring to FIG. 2, illustrates a pictorial view 200 of headlight beam in "low" position with reduced light in the eyes of other individuals, in accordance with an embodiment of a present subject matter. All the components are same as that of FIG. 1, except a headlight beam 102B which is now in "Low" position. In low position of the headlight beam 102B, there may be reduced or no glare in eyes of the users i.e. the pedestrian 103, the cyclist 104, toll plaza person 106 sitting inside the operating room or the vehicle driver 105.

Figure 3A:
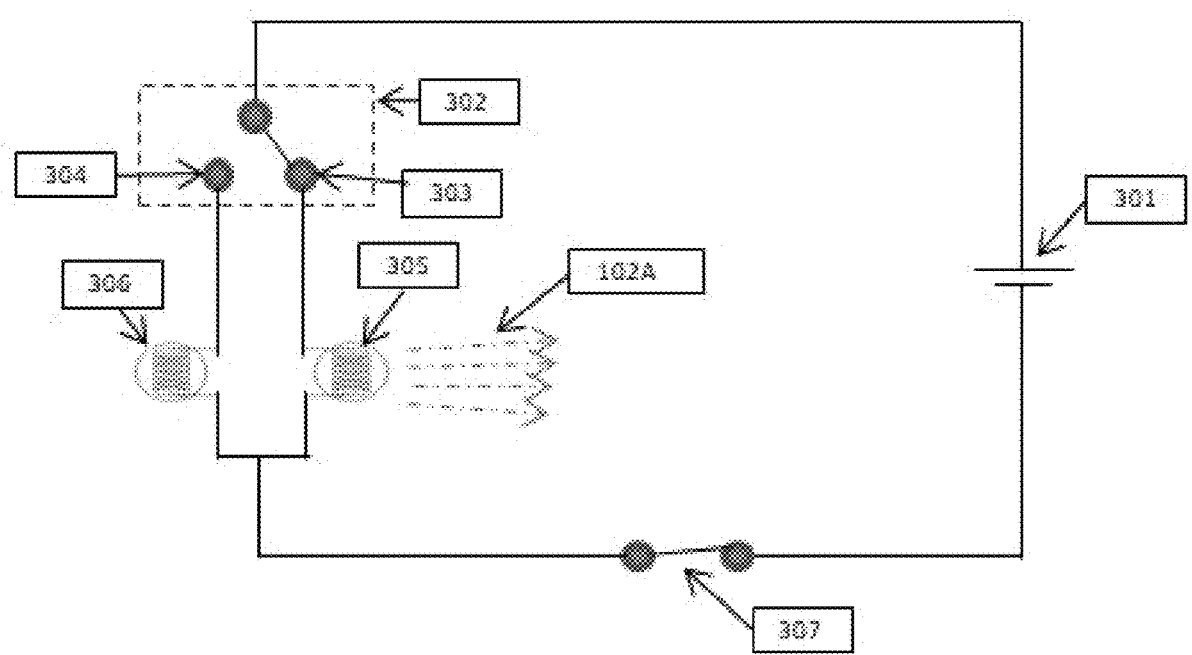
FIG. 3A illustrates a circuit diagram to show working of manual "High to Low/Low to High" switch where high beam filament is ON, in accordance with an embodiment of a present subject matter.

Referring to FIG. 3A, illustrates a circuit diagram to show working of manual "High to Low/Low to High" switch where a high beam filament is ON, in accordance with an embodiment of a present subject matter. A battery 301 may be used to supply electric energy to headlight filaments which may be either the high beam filament 305 or a low beam filament 306. A switch 302 may be used to switch on the high beam filament 305 or the low beam filament 306. The switch 302 may be in contact with the high beam filament's 305 contact terminal 303 to allow flow of current through the high beam filament 305 which may give light in a high Beam 102A.

Figure 3B:
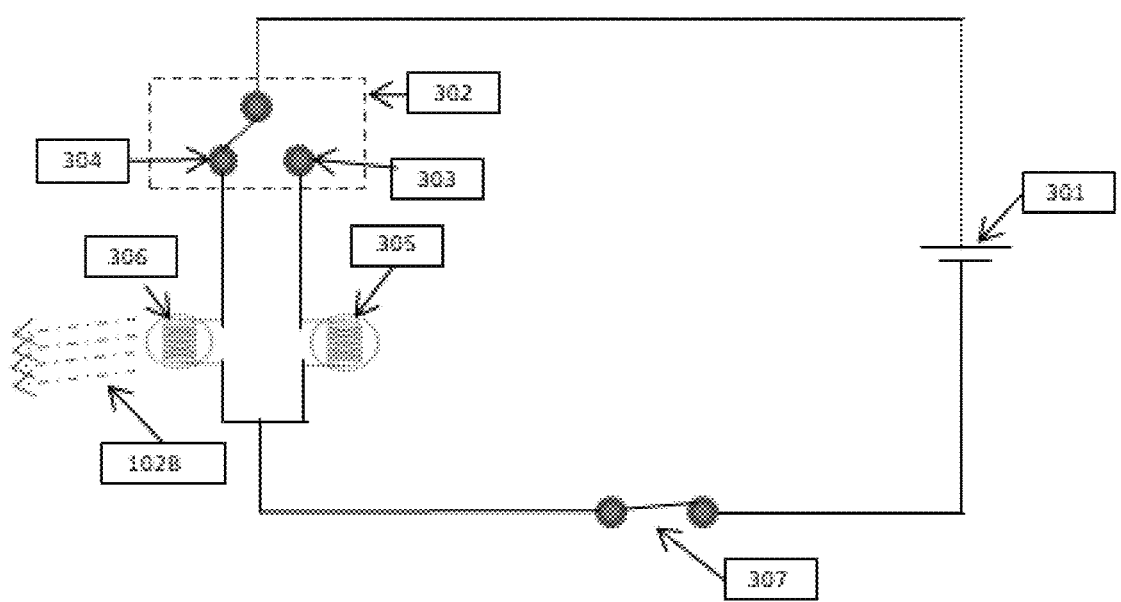
FIG. 3B illustrates a circuit diagram to show working of manual "High to Low/Low to High" switch where low beam filament is ON, in accordance with an embodiment of a present subject matter.

Referring to FIG. 3B, a circuit diagram to show working of manual "High to Low/Low to High" switch where a low beam filament is ON. The battery 301 may be used to supply electric energy to headlight filament. The switch 302 may be used to switch on the high beam filament 305 or the low beam filament 306. The switch 302 may be in contact with the low beam filament 306 contact terminal 304 to allow flow of current through the low beam filament lamp 306 which gives light in a low beam 102B.

Figure 4A:
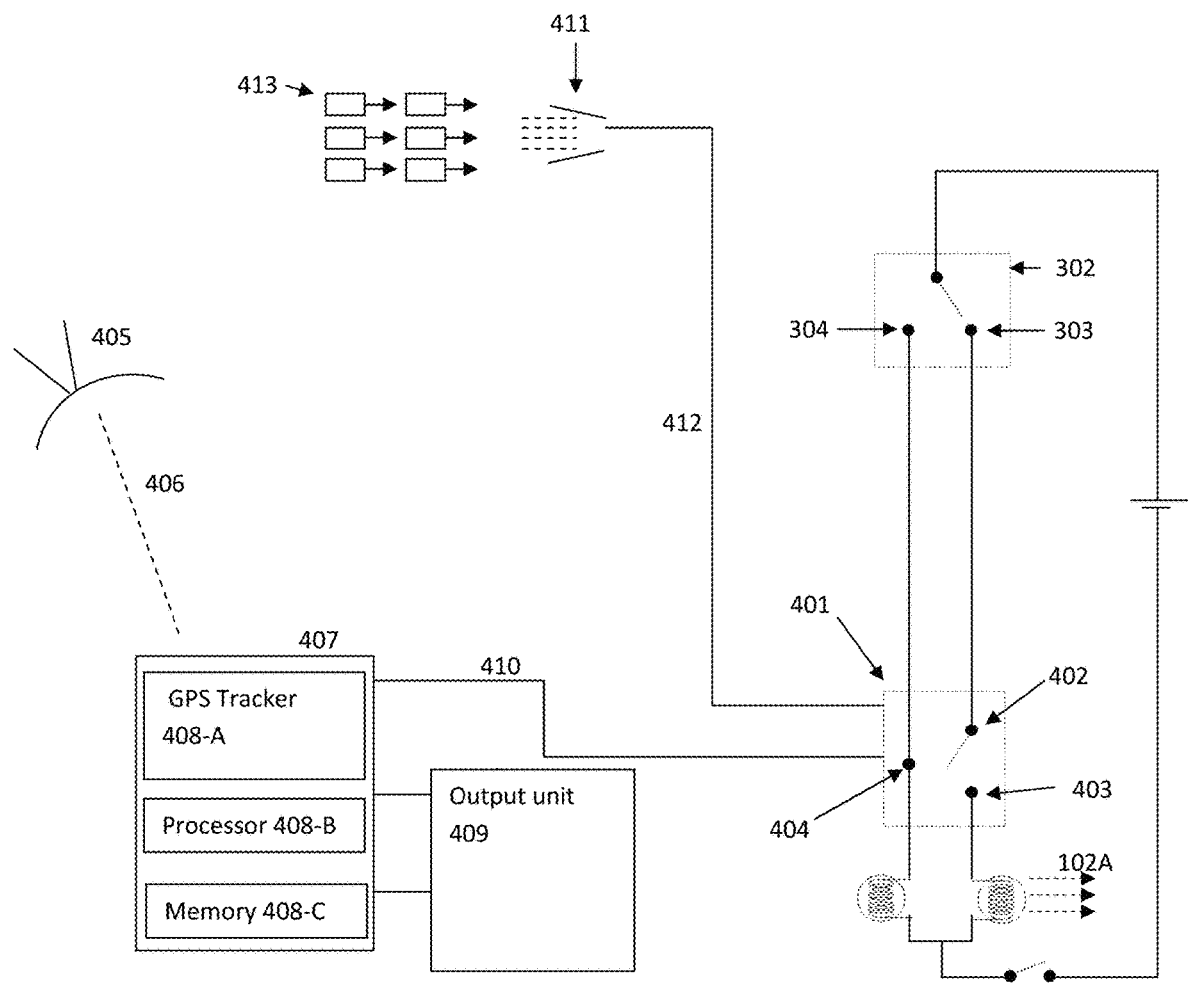
FIG. 4A illustrates a simplified circuit diagram with "HIGH" beam filament ON, in accordance with an embodiment of a present subject matter.
Figure 4B:
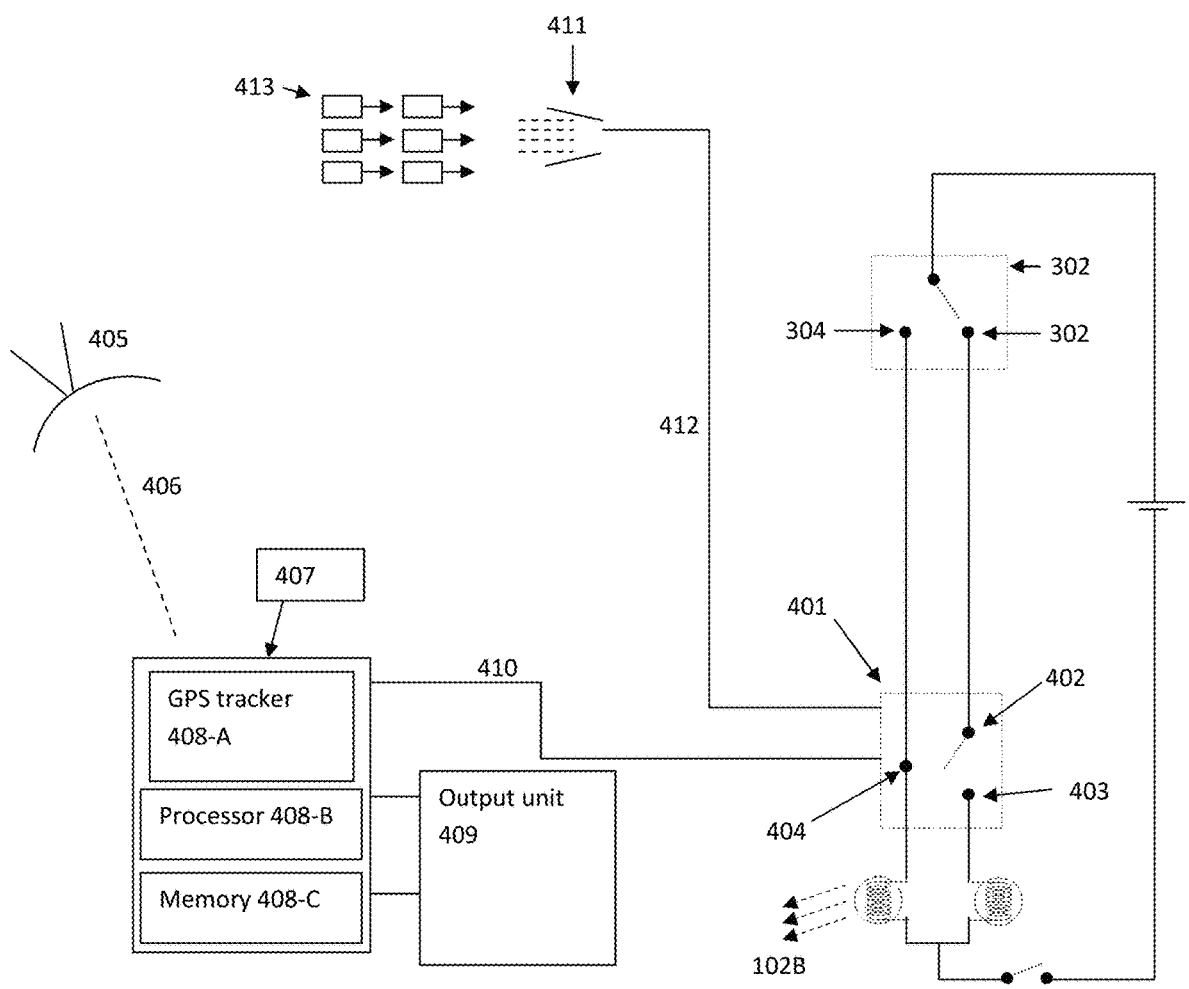
FIG. 4B illustrates a simplified circuit diagram with "LOW" beam filament ON, in accordance with an embodiment of a present subject matter.

Referring to FIGS. 4A and 4B, illustrates a simplified circuit diagram with the high beam filament is 'ON' and the low beam filament is 'ON', in accordance with an embodiment of a present subject matter. FIG. 4A may comprise a user device 407, an output unit 409, a communication link 410, the switch 302, a relay circuit 401, a photo sensor 411 and a connecting wire 412 to activate the relay circuit 401. The user device 407 may further comprise a GPS tracker 408-A, a processor 408-B and a memory 408-C. The relay circuit 401 may further comprise a relay contact point 402 and two or more contact points 403 and 404. The relay contact point 402 and the contact point 403 may be used to get the high beam filament 305 'ON', whereas the relay contact point 402 and the contact point 404 may be used to get the low beam filament 306 'ON'. A satellite or a mobile tower 405 may be used to operate the GPS tracker 408-A in the user device 407 through a communication network 406. The output unit 409 may be inside the user device 407 or may be externally attached to the user device 407. The output unit 409 may provide output in different forms such as audio output and/or video output. Any audio notification/advisory/warning is given by the user device 407 through the output unit 409. The communication link 410 may be used by the user device 407 in order to activate or deactivate the relay circuit 401. The switch 302 has two contact points i.e. a high beam filament contact point 303 and a low beam filament contact point 304. The switch 302 keeps the beam in high position (high beam 102A) when it is at the high beam filament contact point 303 and in low position (low beam 102B) when it is the low beam filament contact point 304.

In one embodiment, it may be understood that the system may also be implemented in a variety of the user devices 407, such as a but are not limited to, a portable computer, a personal digital assistant, a handheld device, a mobile, a laptop computer, a desktop computer, a notebook, a workstation, a mainframe computer, and the like.

In one embodiment, the communication network 406/communication link 410 may be a wireless network, a wired network or a combination thereof. The communication network 406/communication link 410 may be accessed by the user device 407 using wired or wireless network connectivity means including updated communications technology.

In one embodiment, signal from the user device 407 may shift the beam from high to low as the relay contact point 402 may shift from the contact point 403 to another contact point 404. When there is no high beam command from the user device 407, when the switch 302 is in low beam filament contact point 304, the relay circuit 401 contact are between the relay contact point 402 and the contact point 403. In such position, beam is in low position (low beam 102B). The user device 407 may give audio/video advisory/warning to shift back from low beam 102B to high beam 102A. Photons from source of light from opposite vehicle 413 or another source hit the photo sensor 411. The photo sensor 411 may use the connecting wire 412 to activate the relay circuit 401.

Figure 5A:
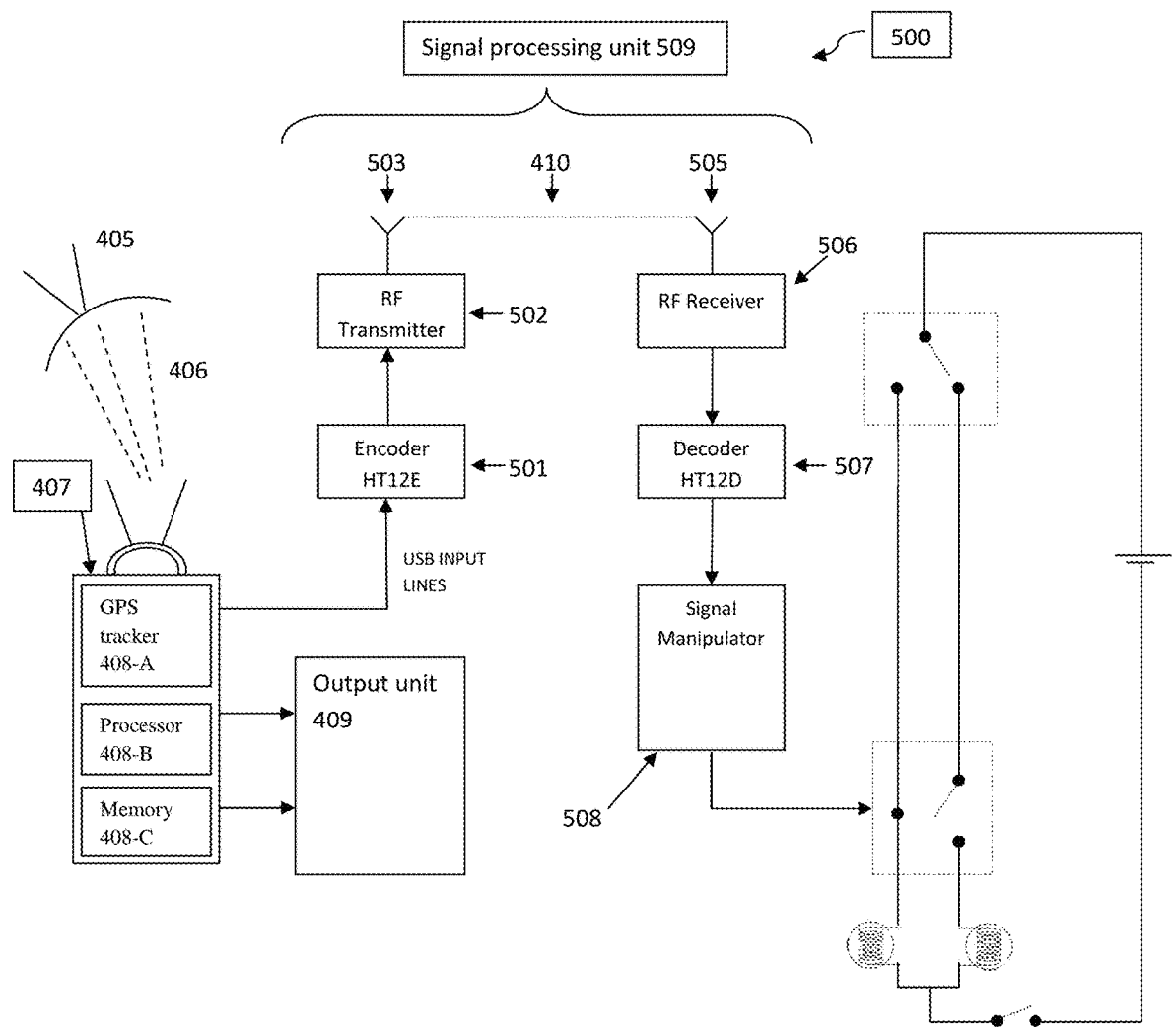
FIG. 5A illustrates a simplified diagram of system 500 including transmitter and receiver block diagram, in accordance with an embodiment of a present subject matter.

Referring FIG. 5A, illustrates a simplified diagram of system 500 including transmitter and receiver block diagram, in accordance with an embodiment of a present subject matter. The system 500 for controlling headlamps of the vehicle is shown. The system 500 may comprise the user device 407, the output unit 409, the switch 302, a relay circuit 401, a signal processing unit 509 and the communication link 410. The signal processing unit may further comprise an encoder 501, RF (Radio Frequency) transmitter 502, a RF receiver 506, a decoder 507, a signal manipulator 508 and antennas 503 and 505. The antennas 503 and 505 may be referred to as a transmitting antenna 503 and a receiving antenna 505 respectively, hereinafter. The transmitting antenna 503 and the receiving antenna 505 antennas may be connected through the communication link 410. The GPS tracker 408-A is capable to receive signals from the satellite or the mobile tower 405. The signals received by the GPS tracker 408-A may be associated with the geographical area, a road width, traffic on the geographical area, toll plaza situated on the geographical area, municipal limits of city/town etc. The processor 408-B of the user device 407 may compare one or more parameters with the predefined threshold value based upon traffic management guidelines and motor vehicle guidelines associated with the received signals.

In one embodiment, the traffic management guidelines and the motor vehicle guidelines comprise various parameters such as but are not limited to speed limit of vehicle in the geographical area, traffic rules, turning point, blind spot, municipal limits of the geographical area, headlamp dipping rules, penalty for violating the traffic rules, etc.

In one embodiment, the processor 408-B may notify the information based upon one or more parameters. The processor 408-B may instruct the user to change the status of the headlamp using the switch 302 based upon the comparison of the one or more parameters with the predefined threshold value.

In one embodiment, the signals may be transmitted from the user device 407 to the encoder 501 further to the RF transmitter 502 and finally to transmitting antenna 503. The communication link 410 may transfer signal/message/pulse to receiver antenna 505. The receiving antenna 505 may pass all the information/signal to the RF receiver 506. Further, the signals may be fed to the decoder 507. The decoder 507 may decodes the signal before feeding it to the signal manipulator 508.

In one embodiment, the signals may be manipulated in terms of voltage and/or current so that it may activate or deactivate the relay circuit 401.

Figure 5B:
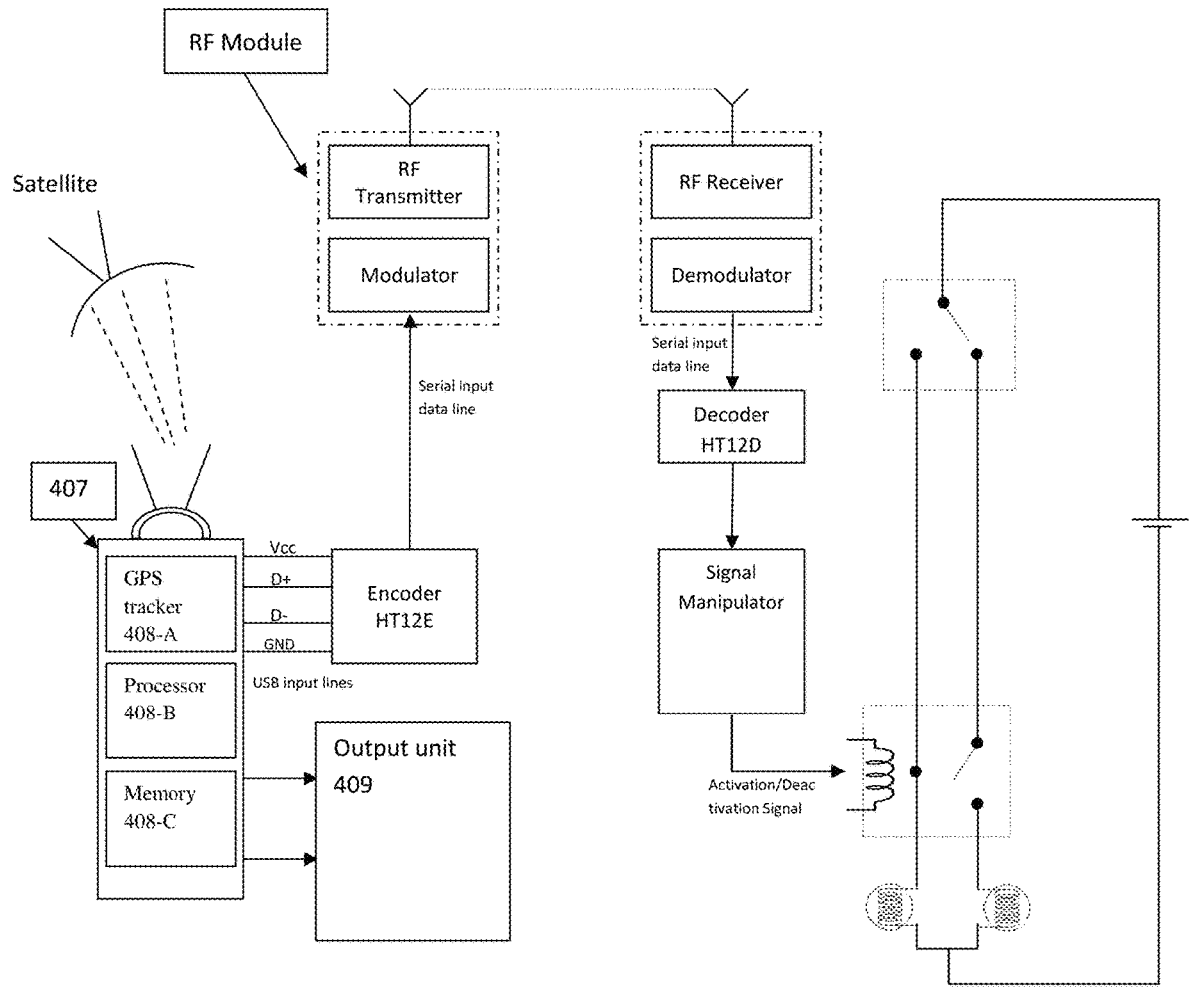
FIG. 5B illustrates a simplified diagram with detailed transmitter and receiver block diagram, in accordance with an embodiment of a present subject matter.

Referring to FIG. 5B, illustrates a simplified diagram with detailed transmitter and receiver block diagram, in accordance with an embodiment of a present subject matter. The system 500 may comprise a modulator to modulate the signal before feeding it to the RF transmitter 502. The system 500 may further comprise a demodulator used to demodulate the signal after passing through the RF receiver 506.

In one embodiment, the processor 408-B control the status of the headlamp upon receiving command by the user based upon the instructions or automatically operating the relay circuit 401 based upon the received signals. The processor 408-B may wait for a predefined time period for the reception of command by the user based upon the instructions. After the expire of the particular time period, the processor 408-B may automatically operate the relay circuit 401 based upon the received signals.

Figure 6:
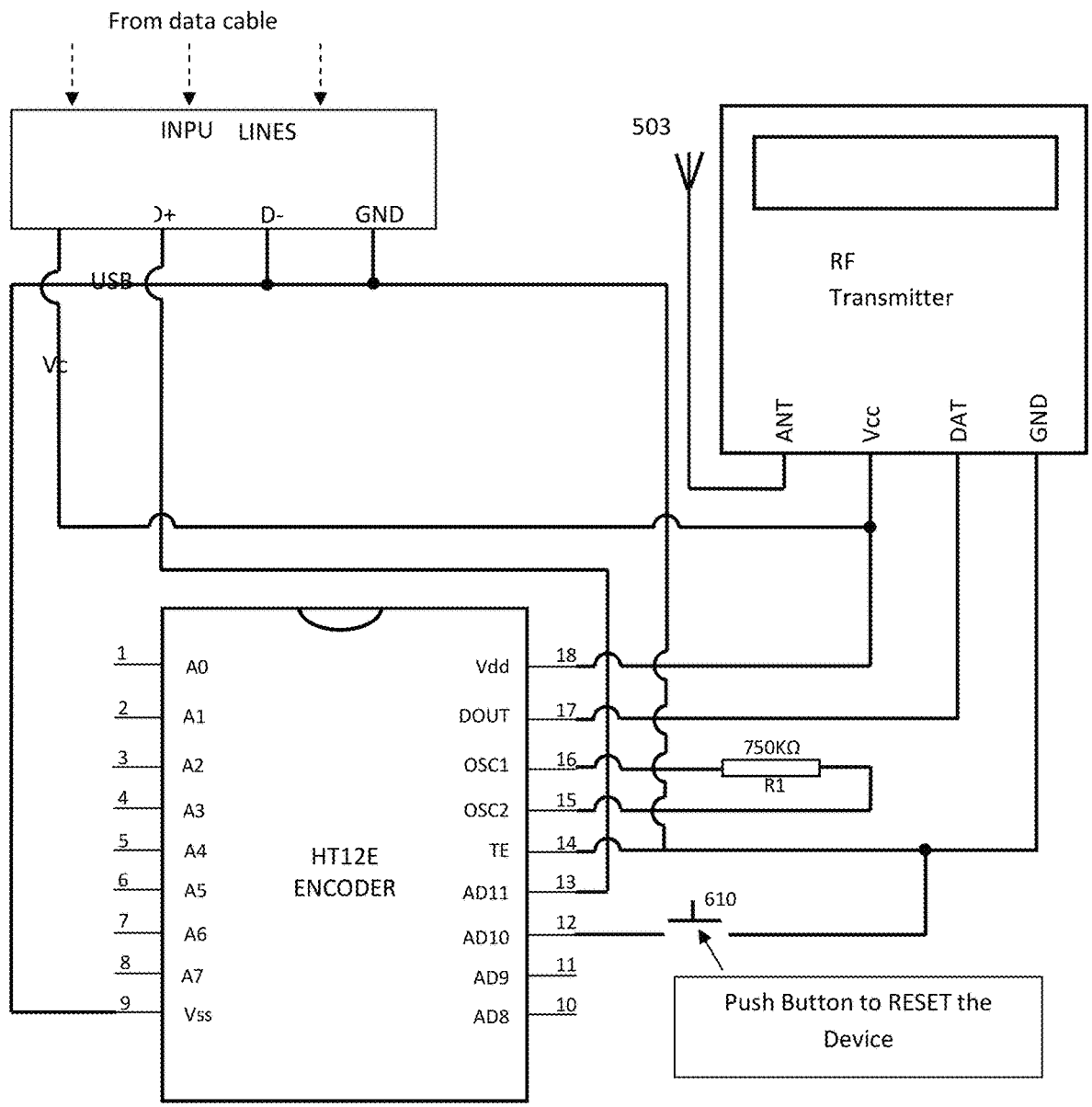
FIG. 6 illustrates a circuit design of a RF transmitter, in accordance with an embodiment of a present subject matter.

Referring to FIG. 6, illustrates a circuit design of the RF transmitter 502, in accordance with an embodiment of a present subject matter.

In one embodiment, the signal coming from the user device 407 which may be encoded by the encoder 501 (such as HT12E). The pins used in the user device 407 may be (Vcc), (D+), (D−), (GND). Further these pins may be connected to the encoder 501. Vcc of the user device 407 may be connected to pin 18 (Vdd) of encoder 501. GND (ground) pin of the user device 407 may be connected to pin 14 (TE) of the encoder 501. (D+) pin of the user device 407 may be connected to pin 13 (AD11). (D−) pin of the user device 407 may be connected to pin 14 (TE) and pin 9 (Vss) of the encoder 501. Pin 12 (AD10) may be connected to GND pin of the user device 407 through a momentary button 610, with a purpose to reset the user device 407. Pins 16 (OSC1) and pin 15 (OSC2) of the encoder 501 may be shorted with resister R1, here 750 kΩ.

In one embodiment, the RF transmitter 502 may be connected to the encoder 501 through three wires. (Vcc) of the RF transmitter 502 may be connected to pin 18 (Vdd) of the encoder 501. GND (ground) of the RF transmitter 502 may be connected to pin 14 (TE). DATA pin of the RF transmitter may be connected to pin 17 (DOUT) of the encoder 501. The transmitting antenna 503 may be connected to ANT pin in order to transmit the data to the receiving antenna 505.

In one embodiment, the (Vcc) pin and GND pin of the user device 407 may power the encoder 501 and RF transmitter 502 through wires. Pin 12 (AD10) is the reset pin for the encoder 501. The encoder 501 may receive the ground signal for very short period of time resulting in resetting of the user device 407.

In one embodiment, every microprocessor has a clock frequency on which it operates and encodes the input/output signal in a desired time based on the clock frequency. More is the clock frequency; less time is required to send the output signal. Pin 16 (OSC1) and pin 15 (OSC2) may be shorted together through resister R1, here 750 kΩ, to set the operating time of the encoder 501 so that it may send the output signal in desired time.

In one embodiment, pin 17 (DOUT) may be used to send the encoded data from PDA (407) to RF transmitter 502. As the satellite data which is to be encoded may require pulse signals of different frequencies which may be further transmitted to the RF transmitter 502.

Figure 7:
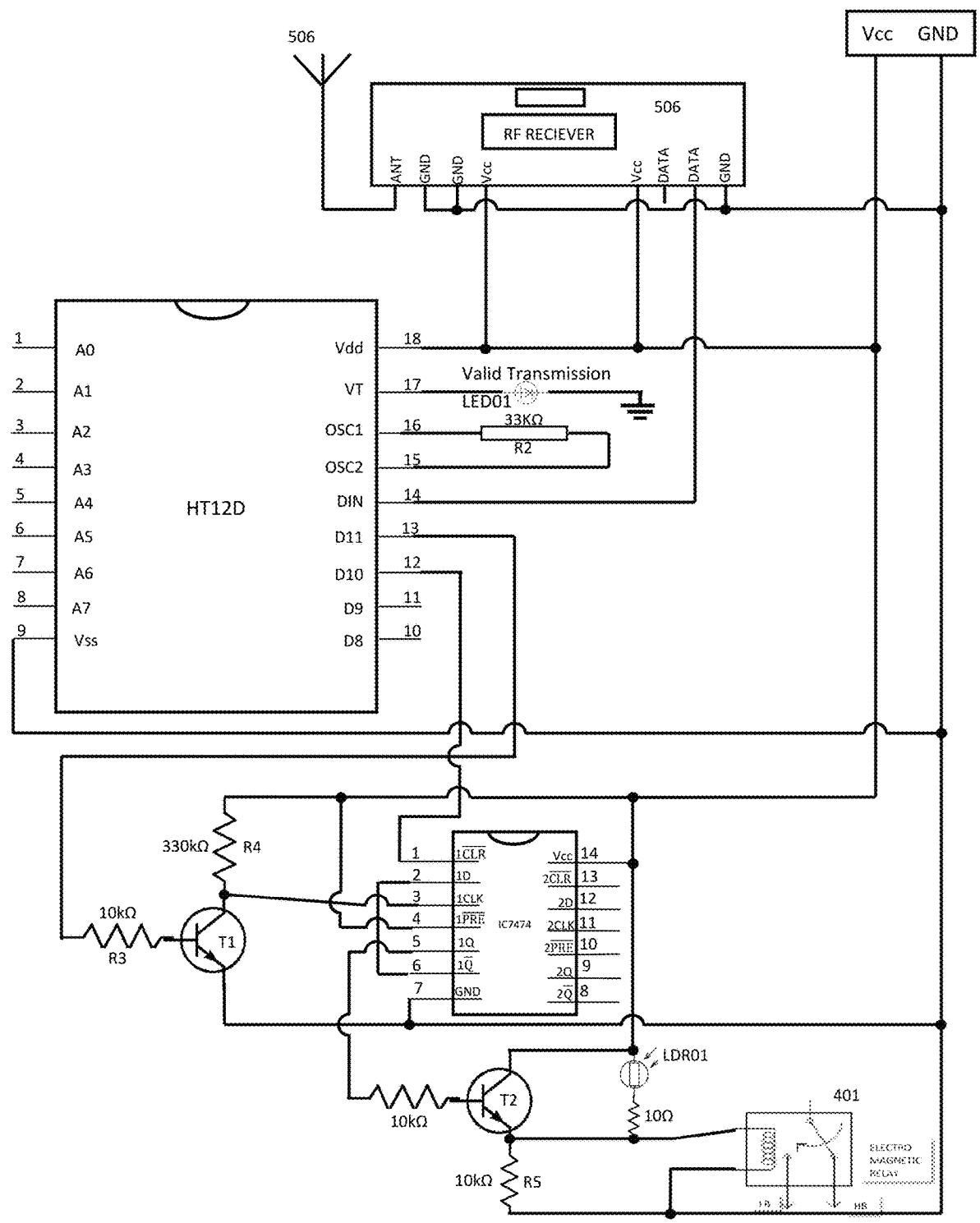
FIG. 7 illustrates a circuit design of a RF receiver, in accordance with an embodiment of a present subject matter.

Referring to FIG. 7, illustrates a circuit design of the RF receiver 506, in accordance with an embodiment of a present subject matter. The RF receiver 506 and the switch 302 may be used to control the beam of headlamp. The data from the user device 407 may be encoded and then the encoded data may be transmitted to the RF transmitter 502. The transmitted data may now be received by the RF receiver 506.

In one embodiment, the RF receiver 506 may use eight pins. There may be two Vcc pins and three GND (ground) pins in the receiver module which may be connected to the separate power source terminal Vcc and GND (ground) respectively. The receiving antenna 505 may be connected to the ANT pin of the RF receiver 506. DATA pin of the RF receiver 506 may be connected to pin 14 (DIN) of the decoder 507 (such as HT12D). Pin 18 (Vdd) of the decoder 507 may be connected to Vcc of the power source and pin 9 (Vss) may be connected to GND (ground) of the power source. Pin 17 (VT) may be connected to a LED to show the data transmission status. Pin 16 (OSC1) of the decoder 507 and pin 15 (OSC2) may be shorted together through a resister R2 (33 kΩ). Pin 13 (D11) of the decoder 507 may be connected to BASE of transistor (T1) through resistor R3 (10 kΩ).

The truth table of D-flip flop is mentioned below:

| INPUT | | | | OUTPUT | |
|---|---|---|---|---|---|
| PR | CLR | CLK | D | Q | Q* |
| 0 | 1 | X | X | 1 | 0 |
| 1 | 0 | X | X | 0 | 1 |
| 0 | 0 | X | X | 1 | 1 |
| 1 | 1 | ↑ | 1 | 1 | 0 |
| 1 | 1 | ↑ | 0 | 0 | 1 |
| 1 | 1 | 0 | X | Q0 | Q0* |

In one embodiment, pin 12 (D10) of the decoder 507 may be connected to pin 1 of flip-flop (IC 7474). COLLECTOR pin of transistor (T1) may be connected to (Vcc) through resistor R4 (330 kΩ). Pin 3 of flip-flop (IC 7474) may be connected to COLLECTOR pin of transistor (T1). EMITTER pin of transistor (T1) may be connected to GND of power source. Pin 2 of flip-flop (IC 7474) and pin 6 of flip-flop (IC 7474) may be shorted together. Pin 4 of flip-flop (IC 7474) may be connected to Vcc of power source. Pin 7 of flip-flop (IC 7474) may be connected to GND of the power source. Pin 5 of flip-flop (IC 7474) may be connected to BASE of transistor (T2) through 10 kΩ resistor. Pin 14 of flip-flop (IC 7474) may be connected to Vcc of the power source. Further pin 14 of flip-flop (IC 7474) may be connected to a Light Dependent Resistor (LDR 01). COLLECTOR pin of transistor (T2) may also be connected to the LDR 01. EMITTER pin of transistor (T2) may be connected to positive side of the relay circuit 401.

In one embodiment, a resistor R5 (10 kΩ) may also be connected to EMITTER pin of transistor (T2) which may be further connected to GND of relay circuit (401) and the power source. The RF receiver 506 may be connected to the power source. ANT pin used to receive the data from the RF receiver 506. DATA pin of the RF receiver 506 may send the data from the RF receiver 506 to the decoder 507. The decoder 507 may be powered by Vdd pin and Vss pin (ground) from source. Pin 14 of the decoder 507 may receive the data from the RF receiver 506 which is to be decoded.

In one embodiment, the decoder 507, the two oscillator pins OSC1 and OSC2 may be connected through a resistance R2 (33 kΩ). This may be done to decide the width of the pulse that is to be generated by encoder at output. Pin 17 of the decoder 507 may be connected to the Light Emitting Diode (LED 01) to show the data transmission status i.e. visual notification regarding data transmission.

In one embodiment, D type flip flop circuit, having IC 7474, may be used for switching purpose based on digital outputs. In flip-flop (IC 7474) pin 2 and 6 may be shorted. These are input (D) and complimented output (Qbar) pins which may be shorted for solving switching purpose. Say initially output (Q) is "0". Hence accordingly Qbar is "1". "1" gets stored in D (as both are shorted), when clock pulse is received, the output (Q) becomes "1" (truth table) and hence Qbar becomes "0" which gets stored in D (as both are shorted). The process may get repeated as trigger pulse is received as clock input.

In one embodiment, this is just one of the uses of D-FLIP FLOP in a way to get desired output. Pin 1 of IC 7474 may be used as active low pins. It may be used to reset the D-type flip flop. Pin 3 of flip-flop (IC 7474) may be used as clock 1 input which may be received from COLLECTOR pin of transistor (T1). Pin 4 of flip-flop (IC 7474) may be used as present 1 input which may be connected to Vcc of the power source. Pin 5 of flip-flop (IC 7474) may be the output which may be decided on the basis of inputs. BASE pin of transistor (T2) may be connected to pin 5 (output) of flip-flop (IC 7474). When the output from pin 5 of flip-flop (IC 7474) is low then the transistor does not allow the flow of current from COLLECTOR to EMITTER. When the output is high from pin 5 (output) of flip-flop (IC 7474) the transistor (T2) allows to flow of current from COLLECTOR to EMITTER which turns ON the relay circuit (401) which is connected to terminals of headlight filaments.

Figure 8:
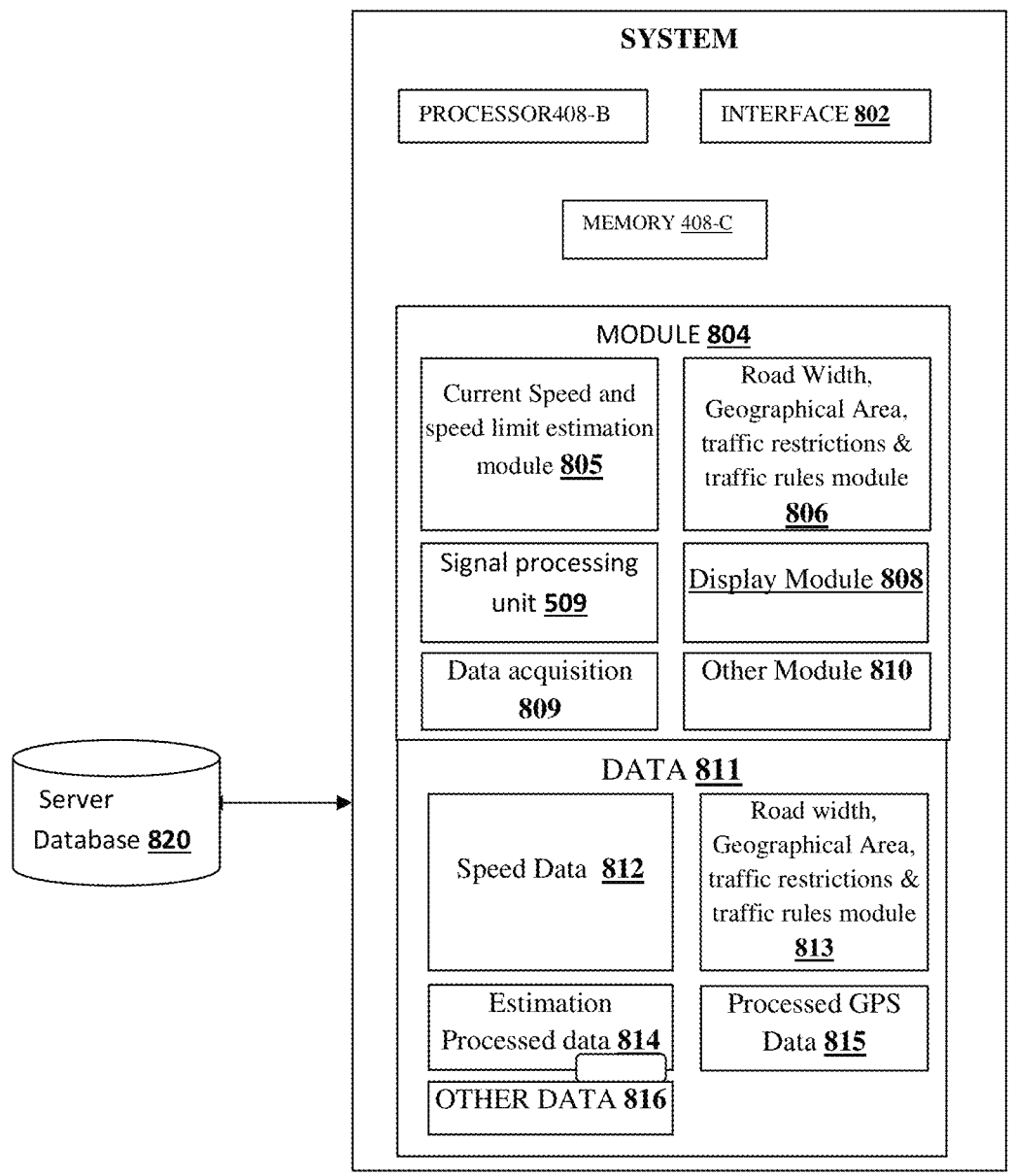
FIG. 8 illustrates an architecture of computing system for implementing the present invention, in accordance with an embodiment of a present subject matter.

Referring to FIG. 8, illustrates an architecture of computing system 500 for implementing the present invention, in accordance with an embodiment of a present subject matter.

In one embodiment, the system 500 may comprise one or more processor(s) 408-B, an interface(s) 802 and a memory408-C with a Random Access Memory ("RAM"), an Electronically Erasable Programmable Read-Only Memory ("EEPROM"), and any other suitable data storage means. The memory 408-C is coupled to the processor 408-B. The processor(s) 408-B, may be implemented as one or more microprocessors, microcomputers, microcontrollers, digital signal processors, central processing units, logic circuitries, and/or any devices that manipulate signals based on operational instructions. Among other capabilities, the processor(s) 408-B may be configured to fetch and execute computer-readable instructions stored in the memory 408-C.

In one embodiment, the functions of the various elements shown in the FIG. 8, including any functional blocks labeled as "processor(s)" 408-B, may be provided through the use of dedicated hardware as well as hardware capable of executing software in association with appropriate software. When provided by a processor 408-B, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

In one embodiment the interface(s) 802 may include a variety of software and hardware interfaces, for example, interfaces for peripheral device(s), such as a keyboard, a mouse, and an external memory. Further, the interfaces 802 may facilitate multiple communications within a wide variety of protocol types including, operating system 500 to application communication, inter process communication, etc. The processor 408-B and the memory 408-C of the computing system may be connected by an input/output (I/O) interface 802 to other devices and/or modules of the system 500.

In one embodiment, the memory 408-C may comprise any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one embodiment, the memory 408-C may store a navigation application 804 that includes program logic for generating navigation maps in relation to vehicle position for display by the interface 802. The memory 408-C may also store various cartographic data and general navigation data to facilitate the various navigation functions provided by the system 500.

In one embodiment, the memory 408-C may store "enhanced" data, GPS data to be accessed by the processor 408-B. Enhanced data connection may include, but is not limited to, route characteristic data such as speed limits, road width, road grades, elevation gain, area population, traffic signs and/or signals, interchanges, converging lanes, etc. As such enhanced GPS data may be associated with each location (i.e., coordinates) along a route. This data may be permanently stored on the memory 408-C or any associated computer readable media, such as flash memory, CD/DVD, etc. Alternatively, this data, as well as weather data, traffic data, etc., may be accessed via wireless protocols from a remote data store, satellite or other broadcast medium, etc., via the data acquisition module 809 or other vehicle systems that are capable of sending and receiving data. The data received by data acquisition module 809 or other suitable vehicle systems is temporarily stored on memory 408-C for access by the processor 408-B.

In one embodiment, the system 500 may include module(s) 804 and data 811. The modules 804 and the data 811 may be coupled to the processor(s) 408-B. The modules 804, amongst other things, include routines, programs, objects, instructions stored in the memory 408-C components, data structures, etc., which perform particular tasks or implement particular abstract data types. The modules 804 may also be implemented as, signal processor(s), state machine(s), logic circuitries, and/or any other device or component that manipulate signals based on operational instructions. In another aspect of the present subject matter, the modules 804 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions may also be downloaded to a storage medium via a network connection.

In one embodiment, the module(s) 804 may include a speed measuring and speed limit check module 805, road width and geographical area and traffic restriction and traffic rules module 806, a signal processing unit 509, a display module 808, a data acquisition unit 809 and other module(s) 810. The other module(s) 810 may include programs or coded instructions or standard data that supplement applications or functions performed by the system 500. The data 811 may include speed data 812, road width and geographical area and traffic restriction and traffic rules 813, estimation processed data 814, processed GPS data 815, and other data 816. The other data 816 amongst other things, may serve as a repository for storing data that is processed, received, or generated as a result of the execution of one or more modules in the module(s). Although the data 811 is shown internal to the system 500, it may be understood that the data 811 can reside in an external repository, such as cloud server (not shown in the figure), which may be coupled to the system. Further, the system 500 may be in communication with the external repository or database 320 through the interface(s) 802 to obtain information from the pre-stored data.

In one embodiment, the current speed and the speed limit estimation module 805 may receive information about the speed and the speed limit in an area through GPS. The system 500 may receive information about current speed from other sources also, like connecting with vehicle's speed sensing module (not shown in the figure) and from other sources. The current speed and the speed limit estimation module 805 may store the received data in the speed data 812. The road width and geographical area and traffic restriction and traffic rules module 806 receives the information about width of current road on which the vehicle is current placed and also acquires information about the estimate population near the area (City, town, village etc) in which the vehicle is present. It may also have information about Municipal limits in city/town. The system 500 may use GPS to acquire this information or may use stored information from the memory 408-C. Further, the road width and geographical area and traffic restriction and the traffic rules module 806 may display the estimated information about the road width and municipal limits, traffic rules on the display of the computing device using display module 808. The display module is in communication with the road width and geographical area and traffic restriction and traffic rules module 806 to display the obtained data and information on the display screen of the computing device. The current speed and speed limit estimation module 805 along with road width and geographical area and traffic restriction and traffic rules 806 calculates the need to shift the beam of headlight to low/high position. The signal processing unit 509 may be communicable connected with the current speed and speed limit estimation module 805 and the road width and geographical area and traffic restriction and traffic rules module 806. The GPS processing module 807 receives the position coordinates of the communicating device on regular basis. To receive the position coordinates, the GPS tracker 408-A of the communicating device should be open throughout. Upon receiving the position coordinates, the GPS processing module 807 sends the calculated information to the display module 808 for displaying on the computing device.

The display module 808 may be coupled with speed limit estimation module 805 and geographical area and traffic restriction and traffic rules module 806 and signal processing unit 509. The display module 808 may include the display such as a liquid crystal display (LCD), a light emitting polymer display (LPD), or the like, for displaying content (e.g., maps, instructions and the like, etc.) to the operator.

In one embodiment, the display 808 may also be configured as an input device for receiving commands from the operator to be processed by the system 500. In one embodiment, the display 808 may include a touch sensitive layer on the screen that is configured to receive input from the user. In typical embodiments, the touch sensitive layer is configured to recognize a user's touches applied to the surface of the layer. For example, the position of the touches, the pressure of the touches, general direction of the touches, the time duration of touch and the like may be recognized by the touch sensitive layer. In one embodiment, the functionality of one or more inputs devices may be carried out by icons presented by the touch screen display and activated by an operator's finger, a stylus, etc. In another embodiment, the operator may interact with the virtual keyboard or keypad displayed on the display 808 via a finger, stylus, etc.

In one embodiment, the system 500 includes the data acquisition unit 809 that comprises one or more receivers or transceivers that receives, for example, relative vehicle location data (e.g., GPS data), traffic and/or geographical data, etc. In some embodiments, the data acquisition unit 809 may receive other data for carrying out the functionally of the system 500 including but not limited to enhanced GPS data (e.g., speed limits, road width, etc.) and the like. In other embodiments, the data acquisition unit 809 may transmit data remotely for processing or other steps for carrying out the functionality of the system 500. Data from remote processing locations also may be received by data acquisition unit 809 and forwarded to the appropriate system controller.

The data acquisition unit 809 in one embodiment acts like a vehicle positioning system for identifying the relative location of the vehicle and generating vehicle position indicating signals relative to a fixed coordinate system. The data acquisition unit 809 may include a Global Positioning System (GPS) to carry out this functionality. The data acquisition unit 809 may also preferably include a position translation system that is able to identify the position of the vehicle relative to roads, municipal limits of city/town, and/or any other criteria based on the output of the vehicle positioning system. The data acquisition unit 809 may also be a cellular based system or any other system that identifies the location of the vehicle relative to a fixed coordinate system. The data acquisition unit 809 may further include a data store having lookup information and/or other structured data and/or tables regarding, for example, route data, cartographic data, etc.

In one embodiment, other data 816 may be stored locally in memory 803 or received from a remote data store. For example, historical data 146 indicative of road width, speed limit, municipal limits of city/town, etc., from previous trips that traverse the same or substantially the same route, may be employed.

Figure 9A:
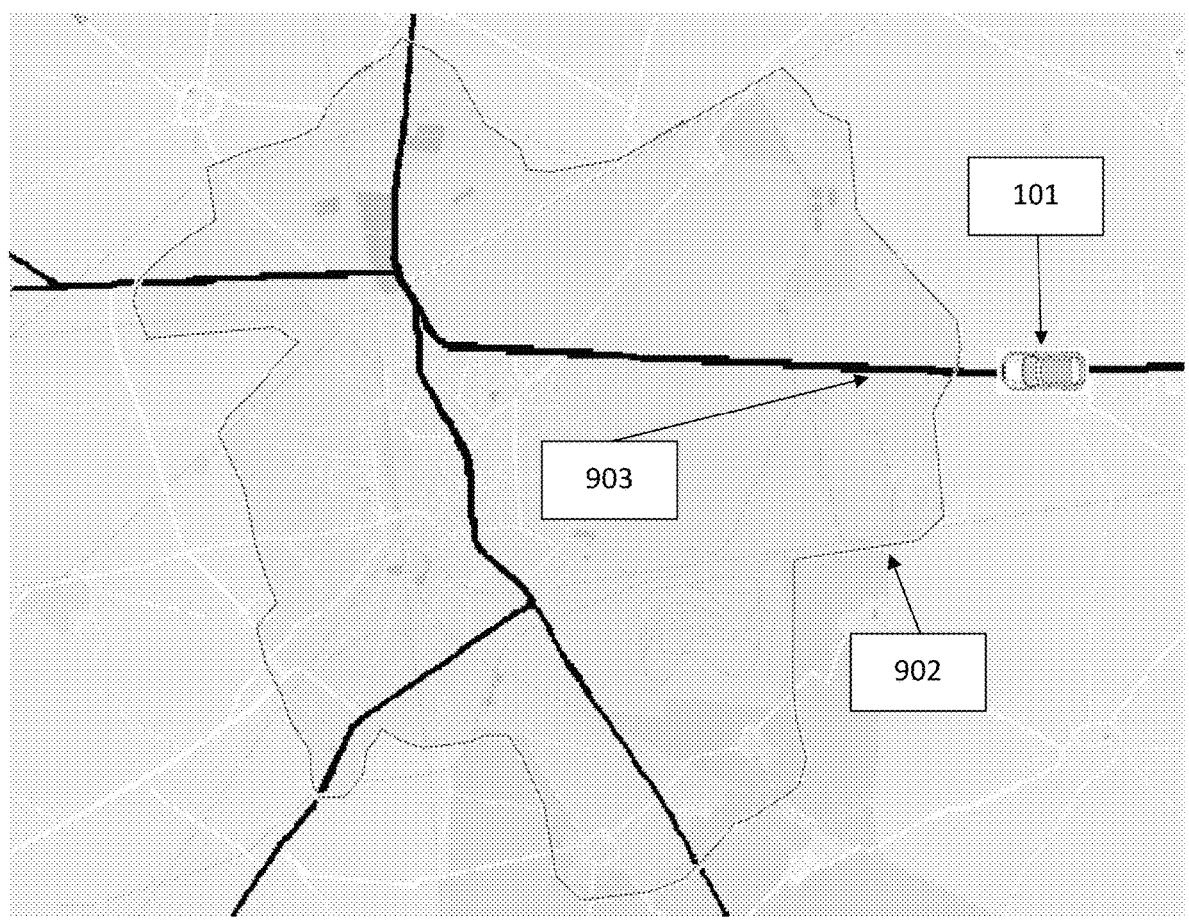
FIG. 9A illustrates a pictorial view of the map of on road scenario along with the vehicle when vehicle is entering in a geographical area, in accordance with an embodiment of a present subject matter.

Referring to FIG. 9A, illustrates a pictorial view of the map of on road scenario along with the vehicle when vehicle is entering in a geographical area, in accordance with an embodiment of a present subject matter. When a vehicle 101, is on the road 903 and approaching the municipal limits of city/town boundary 902, the user device 407 may advise the user to drive the vehicle 101 in prescribed speed limit with headlight in "LOW" beam position. The GPS tracker 408-A may locate the vehicle 101 and give this data to the user device 407. The user device 407 may also inform the user that vehicle's 101 headlights will be switched to "LOW" beam position after few seconds (say 10 seconds), in case user fails to take action at his own. It is with a purpose to avoid headlight glare to other users and compliance of local traffic laws. The user device 407 will also inform the user about penalty amount and other punishments due to non compliance of traffic rules.

Figure 9B:
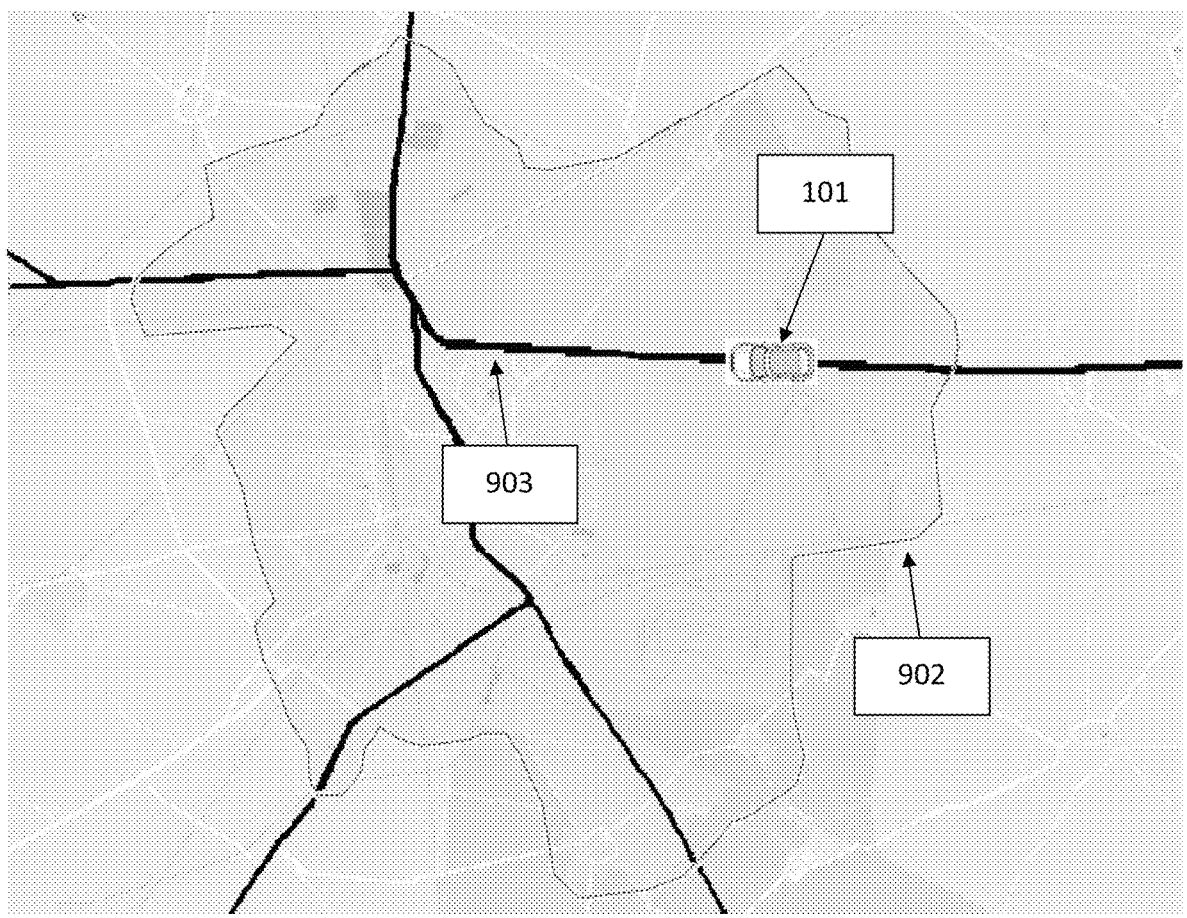
FIG. 9B illustrates a pictorial view of the map of on road scenario along with the vehicle where the vehicle is going through the geographical area, in accordance with an embodiment of a present subject matter.

Referring to FIG. 9B, illustrates a pictorial view of the map of on road scenario along with the vehicle where the vehicle is going through the geographical area, in accordance with an embodiment of a present subject matter. The vehicle 101 has entered the municipal limits of city/town boundary (902), the user device 407 checks the vehicle 101 is in municipal limits of city/town and simultaneously the road width is also checked. If the driver does not respond to audio/visual advisory by shifting the beam from High to Low manually, beam will be shifted automatically from High to Low after delay of few seconds. The encoder 501 will receive the data and decoder 507 will decode the data and send it to flip-flop (IC 7474) in the form of digital inputs. Output of flip-flop (IC 7474) is connected to relay circuit (401) through transistor (T2) which further control the "HIGH/LOW" beam.

Figure 9C:
FIG. 9C illustrates a pictorial view of the map of on road scenario along with the vehicle where the vehicle exiting the geographical area, in accordance with an embodiment of a present subject matter.

Referring to FIG. 9C, illustrates a pictorial view of the map of on road scenario along with the vehicle where the vehicle exiting the geographical area, in accordance with an embodiment of a present subject matter. The vehicle 101 has just exited the geographical area, municipal limits of city/town boundary 902. If beam was shifted automatically to low while entering the municipal limits then the user device 407 will automatically shift beam to "HIGH" position with a time delay of few seconds, with a notification to driver.

Figure 10:
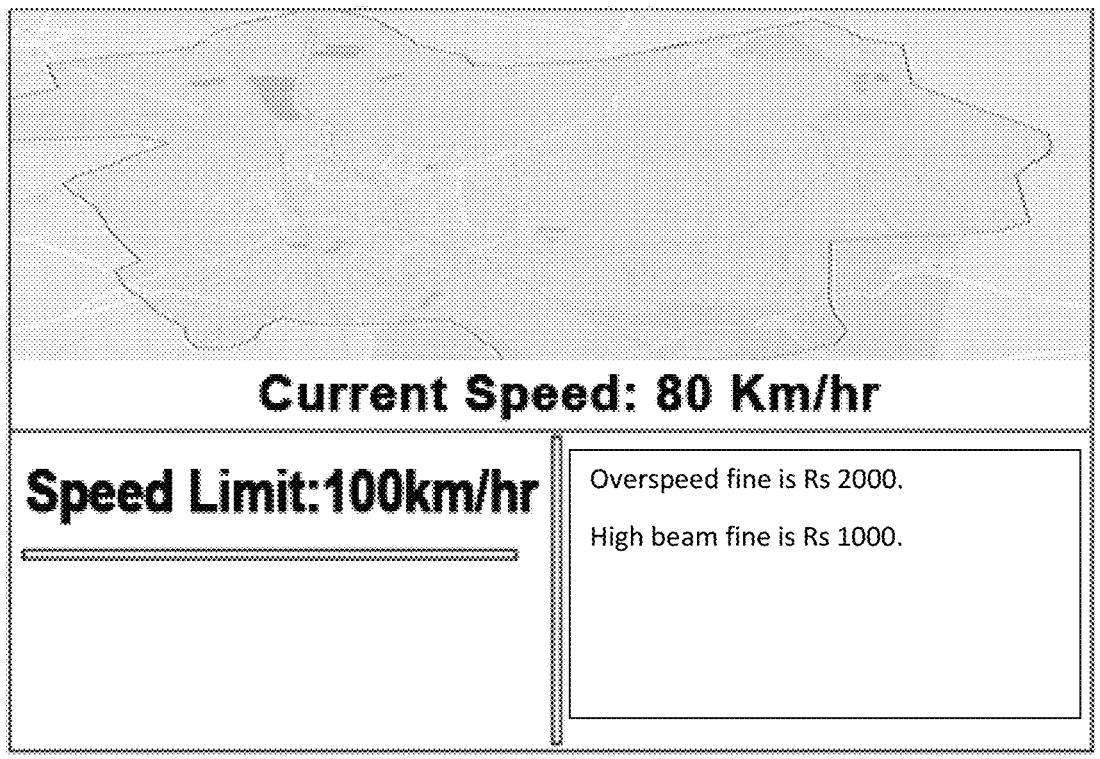
FIG. 10 illustrates a decision-making process and a user interface display in a user device, in accordance with an embodiment of a present subject matter.

Referring to FIG. 10, illustrates a decision-making process in a user device, in accordance with an embodiment of a present subject matter. Use of the display formats of the user device 407 screen is shown which is incorporated with the necessary advisory/warnings that are to be indicated to the user. This screen displays the current speed (say 80 km/hr) at which the user is driving the vehicle. It also shows the speed limit (say 100 km/hr) in that particular area as per local traffic rules.

In one embodiment, first time the user will use the vehicle 101, the user device 407 will ask the user for his vehicle information say type of vehicle (like: motorcycle, car, truck etc.), vehicle registration number, vehicle cubic capacity (CC), type of fuel used (like: diesel, petrol), fuel tank capacity. This information will be required to inform the user about relevant traffic rules in given geographical area or municipal limits of town/city. E.g. speed limit for 2-wheeler is 30 km/hr and 4-wheeler is 40 km/hr. The information will be asked only once from the user that needs to be stored in read only memory (ROM). The information once stored will be displayed every time the user switches ON the user device 407.

Figure 11:
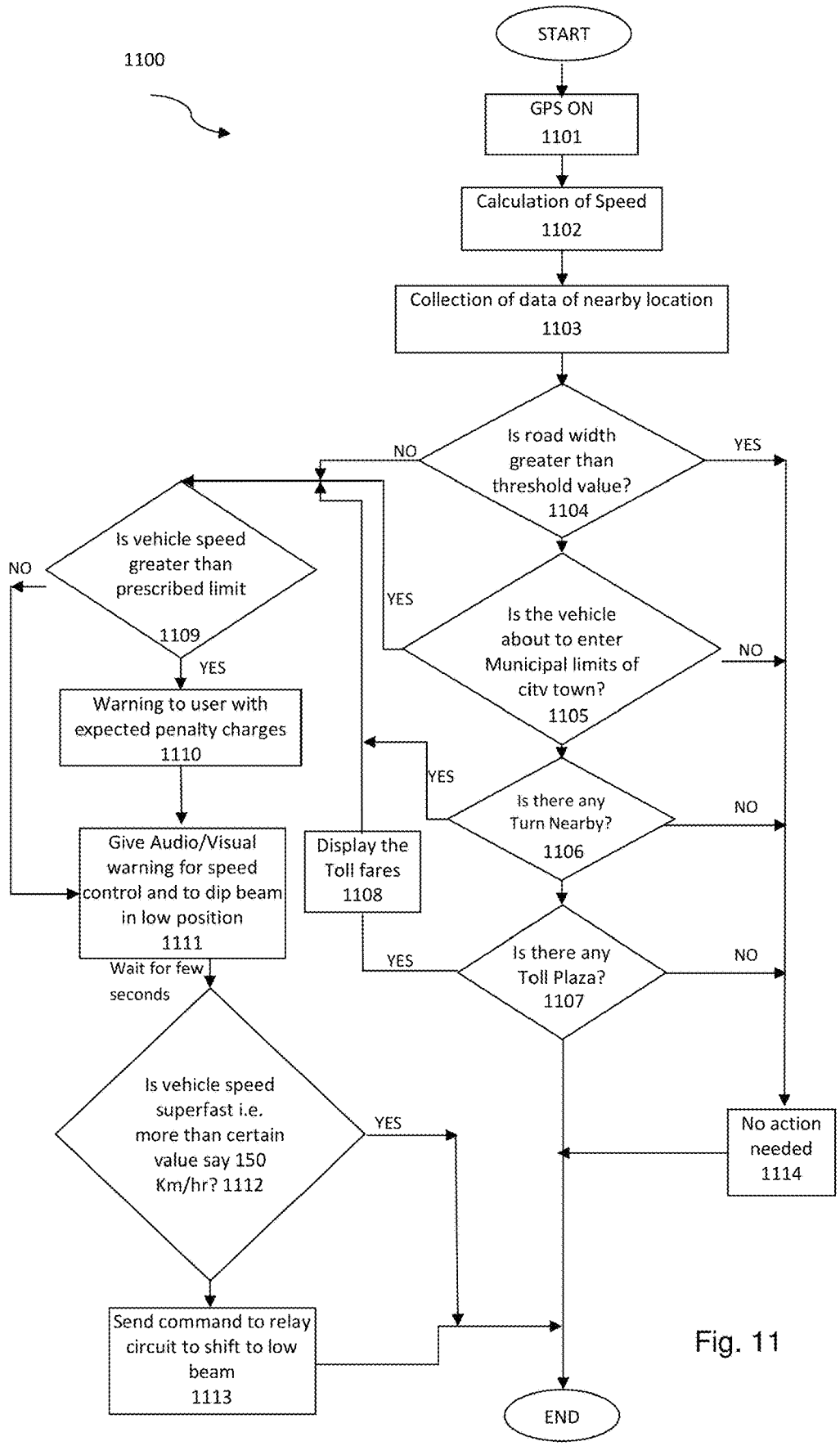
FIG. 11 illustrates flowchart to depict the decision-making process in the user device, in accordance with an embodiment of a present subject matter.

Referring to FIG. 11, illustrates flowchart to depict the decision-making process in the user device 407, in accordance with an embodiment of a present subject matter.

A method 1100 embodying aspects of the present invention where the system 500 is using the data collected from the GPS tracker 408-A for headlamp dipping/switching as a function of road width, geographical area, municipal limits of town/city, toll plazas and local speed limit laws/traffic laws. The method starts with 1101 where the GPS tracking of the user device 407 may be enabled. Then in step 1102, the system may measure the instantaneous speed value of the vehicle 101 with the GPS tracker 408-A and other technologies. After getting speed values, the system may collect the various information/data in step 1103 about the approaching areas like current road width, geographical area, municipal limits of city/town, local speed limit laws/traffic laws, upcoming turns opening on current road, nearby toll plaza along with their toll fare etc. This information may be collected using various technologies e.g. Google API (Application Programming Interface).

Whenever the vehicle 101 violate relevant traffic rules e.g. exceeding speed limits or "High" beam violation, SMS with vehicle 101 details like vehicle registration number, location etc. may be given to main server available with the transporter/vehicle agency at remote places or transport authorities or similar agencies.

Now in next step 1104, the system 500 may check for the road width of the current road being followed by the user monitoring the path followed using the GPS tracker 408-A. If the road width is greater than the predefined threshold value i.e. road is wide enough (say 100 feet) as per local traffic rules that the vehicle can be driven with high beam. So in this case where the road width is greater than the threshold value then the system 500 will take no action (1114). But, if the road width is less than the threshold value i.e. road is not wide enough (say less than 100 feet) then that means the vehicle is not allowed to be driven with high beam as per local traffic rules. So, in this case, the system 500 will go to step 1109, where it will check the current speed of vehicle and may compares with speed limits as per traffic rules. If the user is violating the speed limit rules then the system 500 will give information about speed limits and advisory to adjust the current speed of the vehicle 101, if user is violating the local speed rules. After this, the system 500 will proceed to step 1111. In 1111, the system 500 may provide an audio visual warning/advisory to the user to shift to low beam. After issuing the advisory to the user the system 500 may wait for few seconds (say 10 seconds). This wait is to allow user to dip to low beam manually. Now after the wait period is over, in next step i.e. 1112 the system 500 may check if the current speed of user is beyond the speed limits range and is moving at superfast speed (say if speed limit for the vehicle 101 is 80 km/hr and the vehicle 101 is moving too fast with speed greater than or equal to 150 km/hr). If YES, then the system may not proceed to step 1113 i.e. it won't send a command for automatic dipping of light. If NO, i.e. the vehicle 101 is moving with a speed above speed limit say 80 km/hr but below superfast speed (say 150 km/hr) or is moving within speed limits then in step 1113 the system 500 may generate and send a command to the main circuit to shift to low beam. The system 500 may generate this command irrespective of the fact whether user has dipped manually or not or the system 500 is already in low beam or not.

As an example to the above said description, if the vehicle 101 enters low width road/street (say 30 feet or less) where speed limit is say 60 km/hr and headlight beam legal requirement is LOW beam, the following advisory is given:—"You have entered in area where speed limit is 60 Km/hr for cars, 50 km/hr for trucks, 40 Km/hr for motorcycles/2 wheelers. Headlight beam should be in LOW. Reduce your speed below 60 km/hr. Overspeed fine is Rs 2000. High beam fine is Rs 1000. After 10 seconds, your vehicle headlight beam will be shifted from "High" to "Low". You may deactivate automatic headlamp beam shifting, if required.

A visual notification, diagram high beam (green) with Red Cross flashing on it will be available on the user device 407. Rs. 1000 is also flashed to show Rs. 1000 fine. Rs 2000 will be flashed with speedometer arc to mark overspeed indication. Appropriate warning rules/conventions can be used, as per local traffic rules, to indicate violations or information. As the driver decreases speed within permitted speed range, Rs 2000 overspeed fine flashing will be removed.

Now in next step 1105, the system 500 may check for the municipal limits in the areas nearby (say 1 km) of the current road being followed by the user. If the vehicle 101 is not entering municipal limits of city/town that means the vehicle 101 may be driven with high beam. Municipal limits are also specified by authorities. If municipal limit is specified and data available, information regarding name of municipal limit with traffic rule information is given, e.g. "You have entered Municipal Corporation of Bathinda city and High beam challan is Rs 2000. So in this case where the population is less than the predefined threshold value then the system 500 may take no action (1114). But, If the population nearby is more than the threshold value i.e. no of people living in nearby areas are enough that it counts to a city, town or village then that means the vehicle 101 cannot be driven with high beam. Next system 500 goes to step 1109, where it will check the current speed of vehicle and compares with local speed laws. If the user is violating the speed limit laws then the system 500 may give information about speed limits and advising to adjust the current speed of the vehicle if the user is violating the local speed rules. After this the system 500 may then proceeds to step 1111. In 1111 the system 500 may give an audio-visual warning/advisory to the user to shift to low beam. The system 500 may also give advisory about speed limits and to reduce the current speed of the vehicle 101 if the user is violating the local speed rules. After issuing the advisory to the user the system 500 may wait for few seconds (say 10 seconds). This wait is to allow user to dip to low beam manually. Now after the wait is over, in next step i.e. 1112 the system 500 may check if the current speed of user is beyond the speed limit range and is moving at superfast speed (say if speed limit for a vehicle is 80 Km/hr and the vehicle is moving at superfast speed with speed greater than or equal to 150 Km/hr). If YES, then the system 500 won't proceed to step 1113 i.e. it won't send a command for automatic dipping of light. If NO, i.e. vehicle is moving with a speed faster than upper permissible speed limit but less than superfast speed (say 150 Km/hr) or is moving within speed limits then in step 1113 the system 500 may generate and send a command to the main circuit to shift to low beam. The system 500 may generate this command irrespective of the fact whether user has dipped manually or not or the system 500 is already in low beam or not.

As an example to the above said description, as the vehicle 101 enters in populated area, an audio advisory/warning in the following form is given to driver/user. "You have entered in populated area within municipal limit of a city (Chandigarh). Shift your beam from "HIGH" to "LOW" position. Fine for "HIGH" beam is say Rs 1000 for first offence Rs 500 for second offence as per motor vehicle act. After 10 seconds, your vehicle headlight beam will be shifted from "HIGH" to "LOW". "You may deactivate automatic headlamp beam shifting, if required."

A visual notification, diagram high beam (green) with Red Cross flashing on it will be available on the user device 407. Rs 1000 is also flashed to show Rs 1000 fine. System 500 may shift the beam from high to low after 10 seconds, if not deactivated by the driver. As the vehicle 101 leaves the populated area i.e. municipal limits of city/town, an audio advisory in the following form is given to driver/user. "You have left the populated area. i.e. municipal limit of city Chandigarh. You may Shift your beam from "Low" to "High" position. After 10 seconds, your vehicle headlight beam will be shifted from "Low" to "High" automatically if it was shifted automatically from "high" to "low" while entering the city/town.

Now in next step 1106, the system 500 may check if any turns are opening nearby (say 1 km) or accident-prone area marked by authorities on the current road which is being followed by the user. If NO, then that means the vehicle 101 may be driven with "High" beam. So in this case the system 500 may take no action (1114). But, if there are some turns nearby or accident-prone area in on-going direction then the vehicle 101 cannot be driven with high beam. The system 500 may go to step 1109, where it may check the current speed of vehicle and compares with local speed rules. If the user is violating the speed rules then the system 500 may give information about speed limits and advising to reduce the current speed of vehicle, if the user is violating the local speed rules. After this the system 500 may proceed to step 1111 where it will give an audio-visual warning/advisory to the user to shift to "Low" beam. The system 500 may also give advisory about speed limits and to reduce the current speed of the vehicle 101 if the user is violating the local speed rules. After issuing the advisory to the user the system 500 may wait for few seconds (say 10 seconds). This wait is to allow user to dip to "Low" beam manually. Now after the wait is over, in next step i.e. 1112, the system may check if the current speed is beyond the speed limit range and is moving with superfast speed (say if speed limit for a vehicle is 80 Km/hr and the vehicle 101 is moving at superfast speed with speed of greater than or equal to 150 Km/hr). If YES, then the system won't proceed to step 1113 i.e. it won't send a command for automatic dipping of light. If NO, i.e. the vehicle 101 is moving with a speed more than speed limit but less than superfast speed than local speed limits or is moving within speed limits then in step 1113 the system may generate and send a command to the main circuit to shift to "Low" beam. The system may generate this command irrespective of the fact whether user has dipped manually or not or the system is already in "Low" beam or not.

As an example to the above said description, as the vehicle 101 is about to reach a turn on the road/street where speed limit is say 60 km/hr and headlight beam legal requirement is "LOW" beam, the following advisory is given "You have entered in area where speed limit is 60 Km/hr for 4 wheelers, 50 km/hr for trucks. Headlight beam should be in "LOW". Overspeed fine is Rs 2000. Overspeed may topple the vehicle 101 on turn. High beam fine is Rs 1000. After 10 seconds, your vehicle 101 headlight beam will be shifted from "High" to "Low". You can deactivate the system if required. (Automatic beam shifting from high to low is only if speed is above speed limit value but less than superfast speed. If speed is more than superfast speed advisory is given but system won't shift the beam from high to low automatically).

A visual notification, diagram high beam (green) with Red Cross flashing on it will be available on PDA/infotainment system. Rs 1000 is also flashed to show Rs 1000 fine. Rs 2000 will be flashed with speedometer arc to mark overspeed indication.

Now the data will again be collected from the GPS tracker 408-A and the vehicle 101 about the various parameters like speed, road width, municipal limits of city/town, position of manual switch for headlights. As the driver decreases speed within permitted speed range, Rs 2000 flashing will be removed. As the driver manually shifts the beam from "HIGH" to "LOW", Rs1000 flashing will be removed.

Now in next step 1107, the system 500 may check if any toll collection plazas are nearby (say within 1 km) on the current road which is being followed by the user. If NO then that means the vehicle 101 can be driven with high beam. So, in this case the system 500 will take no action (1114). But, if there is any toll collection plaza nearby in on-going direction then the vehicle 101 cannot be driven with high beam. So, in this case the system will go to step 1108 where it will display the toll fares to the user. Then system 500 will go to step 1109, where it may check the current speed of the vehicle 101 and may compare with local speed rules. If the user is violating the speed laws then the system 500 may provide an advisory 1110 about speed limits and to reduce the current speed of vehicle if user is violating the local speed rules. After this the system 500 will then proceeds to step 1111 where it will give an audio-visual warning/advisory to the user to shift to "Low" beam. The system 500 may also give advisory about speed limits and to adjust the current speed of the vehicle if the user is violating the local speed laws. After issuing the advisory to the user the system will wait for few seconds (say 10 seconds). This wait is to allow user to dip to "Low" beam manually. After the wait is over, in next step i.e. 1112, the system may check if the current speed of user is exceeding the speed limits and is moving too fast (say if speed limit for a vehicle is 80 Km/hr and the vehicle is moving too fast with speed greater than equal to 150 Km/hr). If YES, then the system may not proceed to step 1113 i.e. it may not send a command for automatic dipping of light. If NO, i.e. the vehicle 101 is moving with a speed little faster than local speed limits or is moving within speed limits then in step 1113 the system 500 may generate and send a command to the main circuit to shift to "Low" beam. The system 500 may generate this command irrespective of the fact whether user has dipped manually or not or the system is already in "Low" beam or not.

As an example to the above said description, as vehicle is about to reach a toll on the road where headlight beam legal requirement is "LOW" beam, the following advisory is given Headlight beam should be Low". Reduce your speed below 60 km/hr. Overspeed fine is Rs 2000. High beam fine is Rs 1000. After 10 seconds, your vehicle headlight beam will be shifted from "High" to "Low". You can deactivate automatic headlamp beam shifting, if required. (Automatic beam shifting from high to low is only if speed is below certain speed value say 150 km/hr. If speed is more than this value advisory is given but system won't shift the beam from high to low).

A visual notification, diagram high beam (green) with Red Cross flashing on it will be available on PDA/infotainment system. Rs 1000 is also flashed to show Rs 1000 fine. Rs 2000 will be flashed with speedometer arc to mark overspeed indication.

As the driver decreases speed within permitted speed range, Rs 2000 flashing will be removed.

Referring to FIG. 12A-12H, illustrates a user interfaces for different scenarios, in accordance with an embodiment of a present subject matter.

Figure 12A:
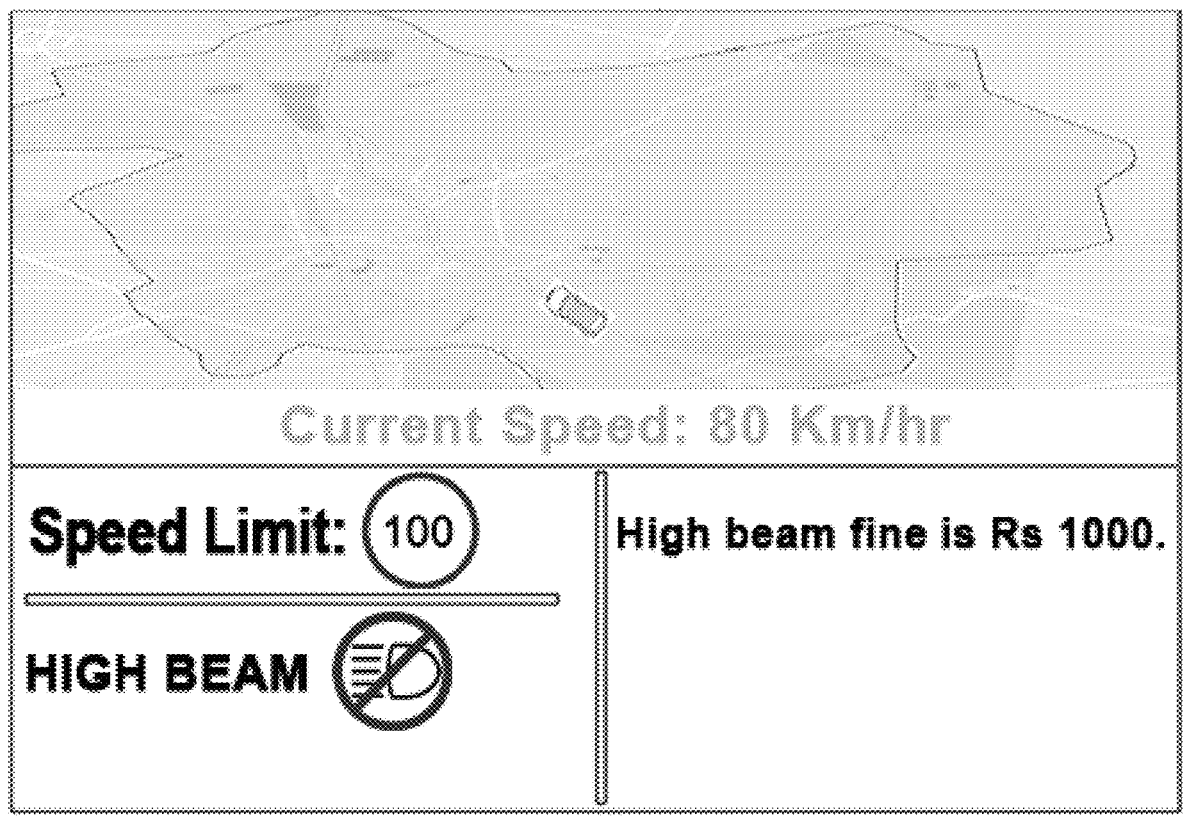
FIG. 12A-12H illustrates a user interfaces for different scenarios, in accordance with an embodiment of a present subject matter.

FIG. 12A gives screen display format when vehicle is in given geographical area having:
 a) Traffic rule to keep the Headlight beam in "Low" with a penalty of Rs 1000 if vehicle is moving with "High" beam.
 b) Speed limit up to 100 km/hr.

Screen displays gives visual display of numerical value of speed i.e. 80 km/hr (in green color) and speed limit as per local traffic rules is 100 km/hr. It means vehicle is moving with safe speed as per local traffic rules.

Screen display gives symbol of prohibition (i.e. red color circle with inclined line at 45°) for high beam. Screen also displays High beam fine of Rs 1000. Audio warnings will accompany the video display so that a user can listen to warning/information without looking at the PDA screen i.e. without losing focus from road ahead.

Figure 12B:
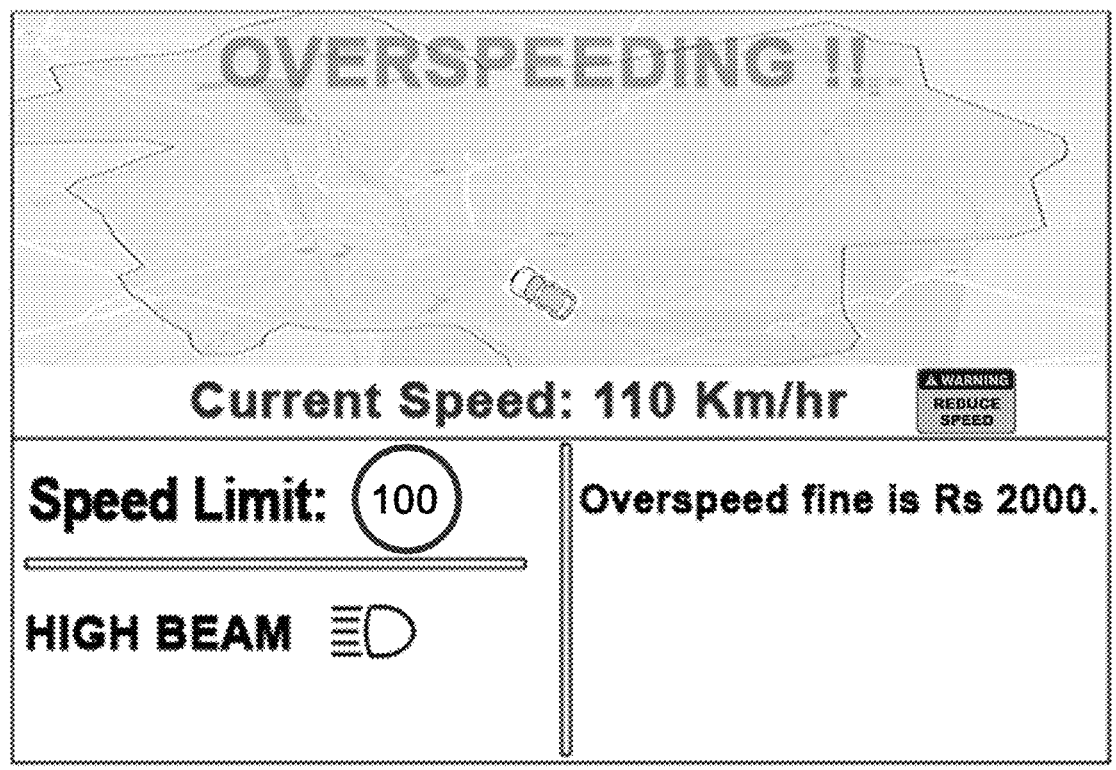

FIG. 12B gives screen display format when vehicle is in given geographical area having:
 a) Traffic rule which allows to keep headlight beam in "high" though driver can keep in "low" as per choice.
 b) Speed limit is 100 km/hr.

Screen display gives visual display of numerical value of current speed i.e. 110 km/hr (red color) and speed limit as per local traffic rule is 100 km/hr. In this scenario, vehicle is moving with speed (110 km/hr) which is more than permitted speed (of 100 km/hr).

Screen display at the top gives warning i.e. "overspeeding !!" in red. Screen also displays overspeed fine of Rs 2000. Audio warnings will accompany the video display so that a user can listen to warning/information without looking at the PDA screen i.e. without losing focus from road ahead. Screen display gives warning regarding overspeeding and gives advisory to reduce the speed (A rectangular warning box with black and yellow colour combination adjoining numerical value of current speed)

Figure 12C:
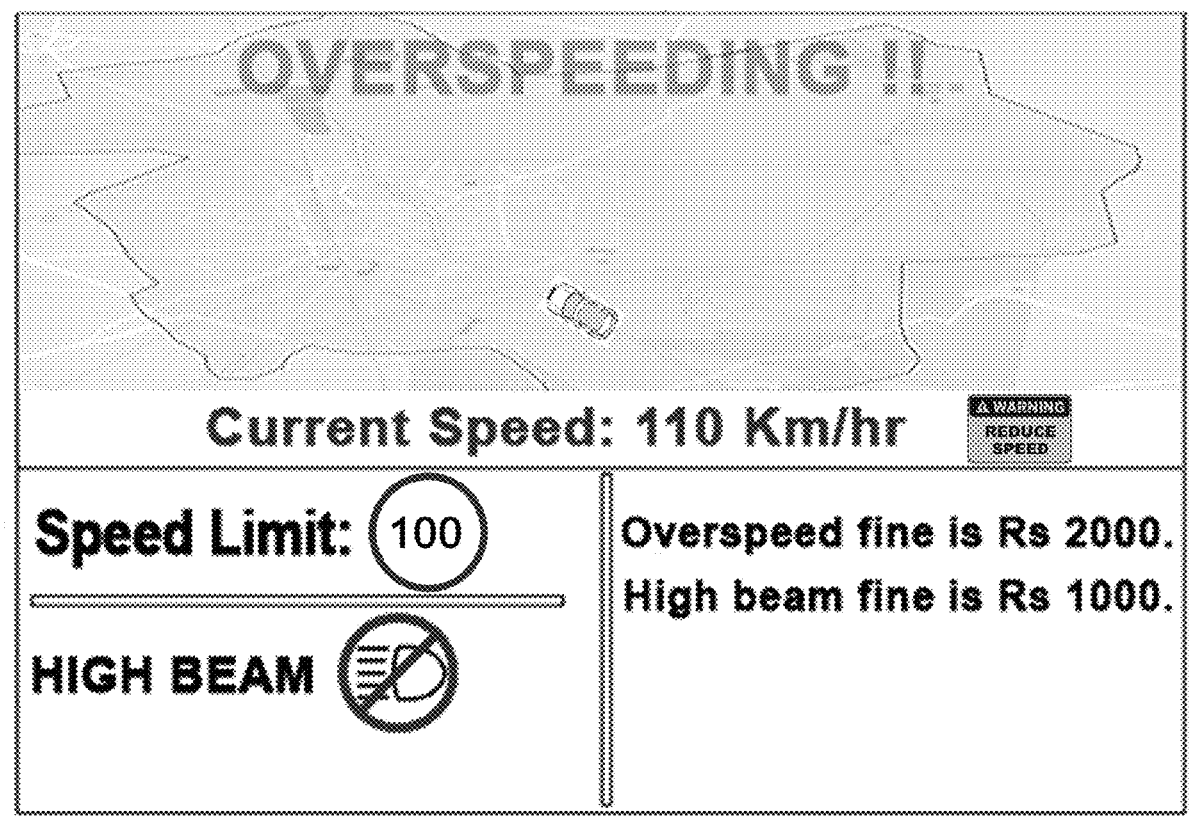

FIG. 12C gives screen display format when vehicle is in given geographical area having:
 a) Traffic rule to keep the Headlight beam in "Low" with a penalty of Rs 1000 if vehicle is moving with "High" beam.
 b) Traffic rule to drive the vehicle at maximum permissible speed of 100 km/hr. Fine for overspeeding is Rs 2000/-

Screen display gives visual display of numerical value of current speed i.e. 110 km/hr (red colour) and speed limit as per local traffic rule is 100 km/hr. In this scenario, vehicle is moving with speed (110 km/hr) which is more than maximum permissible speed (of 100 km/hr).

Screen display at the top gives warning i.e. "overspeeding !!" in red. Screen display also gives symbol of prohibition (i.e. red colour circle with inclined line at 45°) for high beam. Screen also displays High beam fine of Rs 1000 and overspeed fine of Rs 2000. Audio warnings will accompany the video display so that a user can listen to warning/information without looking at the PDA screen i.e. without losing focus from road ahead. (A rectangular warning box with black and yellow color combination adjoining numerical value of current speed)

Figure 12D:
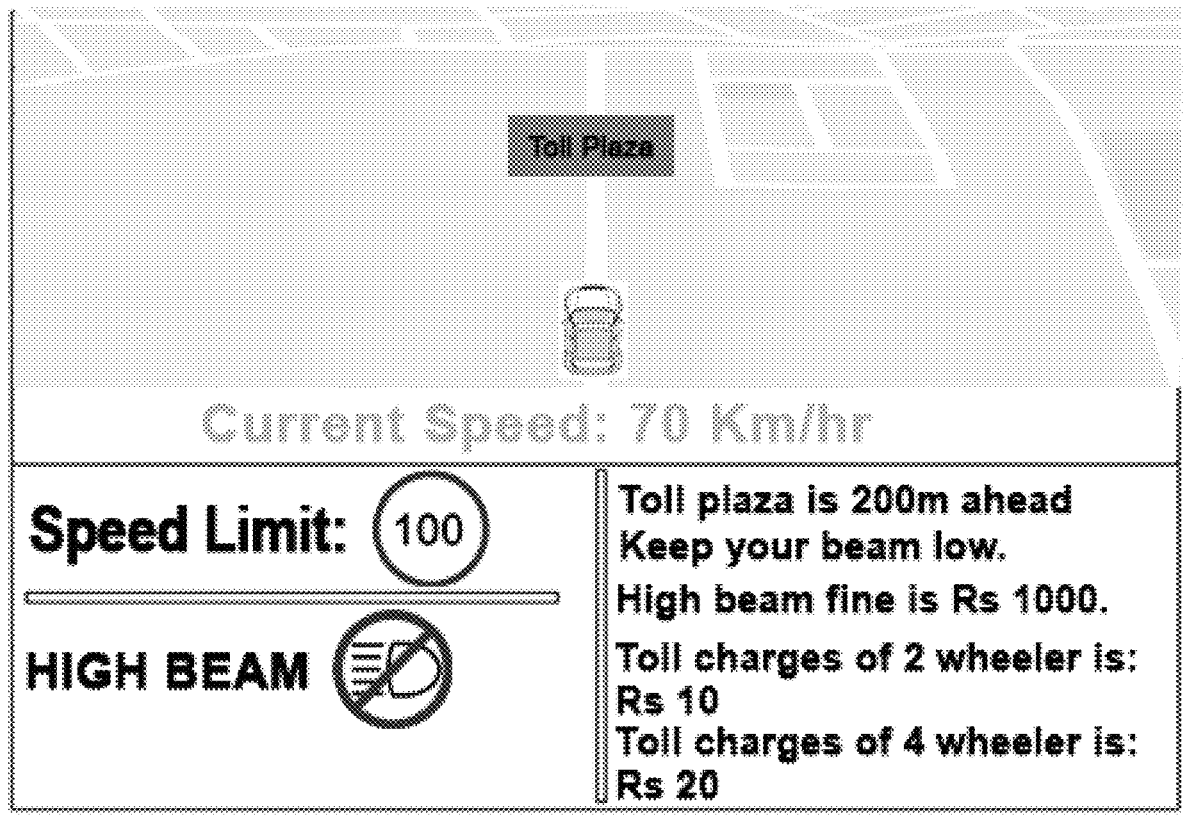

FIG. 12D gives screen display format when vehicle is in given geographical area having:
 a) A toll plaza ahead.
 b) Traffic rule to keep the Headlight beam in "Low" as a toll plaza is ahead.
 c) Speed limit is 100 km/hr.

Screen display gives visual display of numerical value of current speed i.e. 70 km/hr (green color) and speed limit as per local traffic rule is 100 km/hr. It means vehicle is moving with safe speed as per local traffic rules.

Screen display also gives symbol of prohibition (i.e. red colour circle with inclined line at 45°) for high beam.

Screen also displays upcoming toll plaza information as distance to reach toll plaza (200 m ahead), toll charges for 2 wheeler, 4 wheeler or other type of vehicles (like toll charges for 2 wheeler is Rs 10/-, toll charges for 4 wheeler is Rs 20/- etc.)

Audio warnings will also accompany the video display so that a user can listen to warning/information without looking at the PDA screen i.e. without losing focus from road ahead.

Figure 12E:
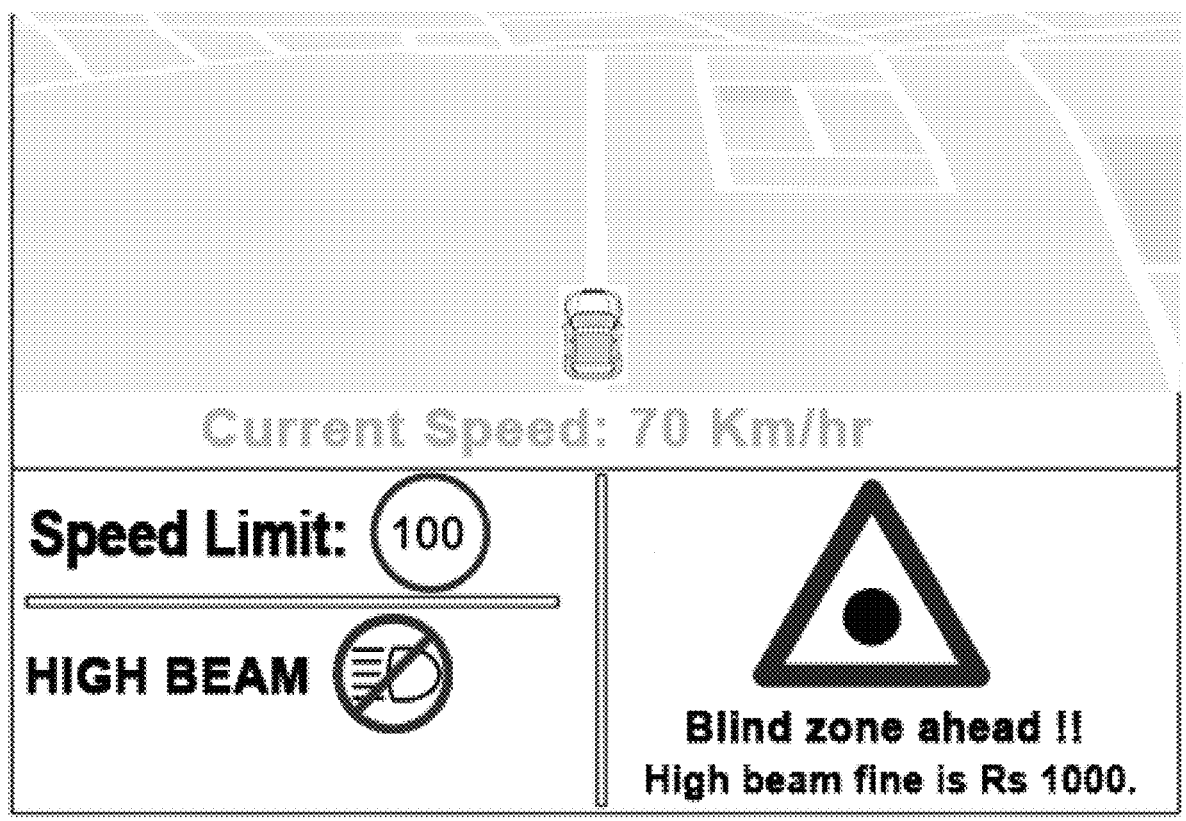

FIG. 12E gives screen display format when vehicle is in given geographical area having:
  a) A Blind Zone ahead.
  b) Traffic rule to keep the Headlight beam in "Low" as a Blind Zone is ahead.
  c) Speed limit is 100 km/hr.

Screen display gives visual display of numerical value of current speed i.e. 70 km/hr (green colour) and speed limit as per local traffic rule is 100 km/hr. It means vehicle is moving with safe speed as per local traffic rules.

Screen display also gives symbol of prohibition (i.e. red colour circle with inclined line at 45°) for high beam.

Screen also displays warning about upcoming blind zone information as Blind Zone ahead with a black spot in red color equilateral triangle which means CAUTION.

Audio warnings will also accompany the video display so that a user can listen to warning/information without looking at the PDA screen i.e. without losing focus from road ahead.

Figure 12F:
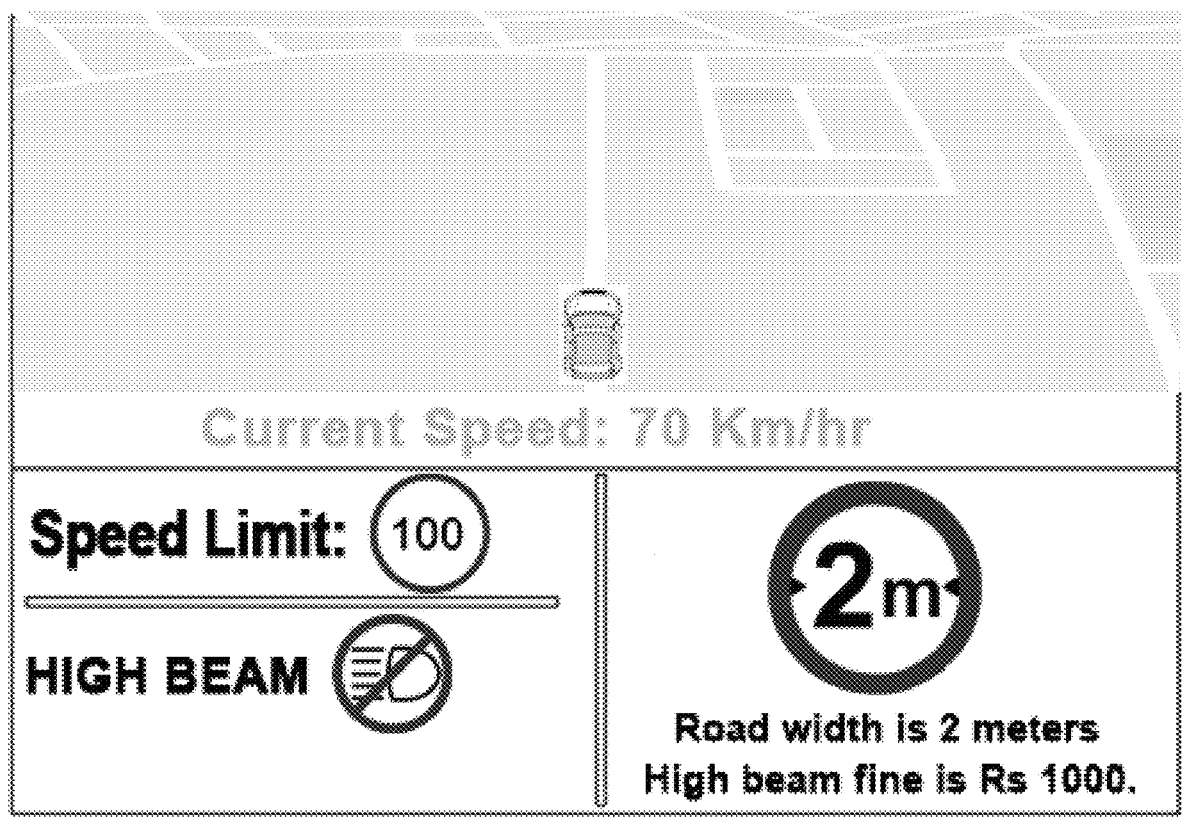

FIG. 12F gives screen display format when vehicle is in given geographical area having:
  a) A narrow road ahead.
  b) Traffic rule to keep the Headlight beam in "Low" as a narrow road is ahead.
  c) Speed limit is 100 km/hr.

Screen display gives visual display of numerical value of current speed i.e. 70 km/hr (green color) and speed limit as per local traffic rule is 100 km/hr. It means vehicle is moving with safe speed as per local traffic rules.

Screen display also gives symbol of prohibition (i.e. red colour circle with inclined line at 45°) for high beam.

Screen also displays warning about narrow road information as "Road width is 2 meters" with a value written in red color circle which indicated road width ahead.

Audio warnings will also accompany the video display so that a user can listen to warning/information without looking at the PDA screen i.e. without losing focus from road ahead.

Figure 12G:
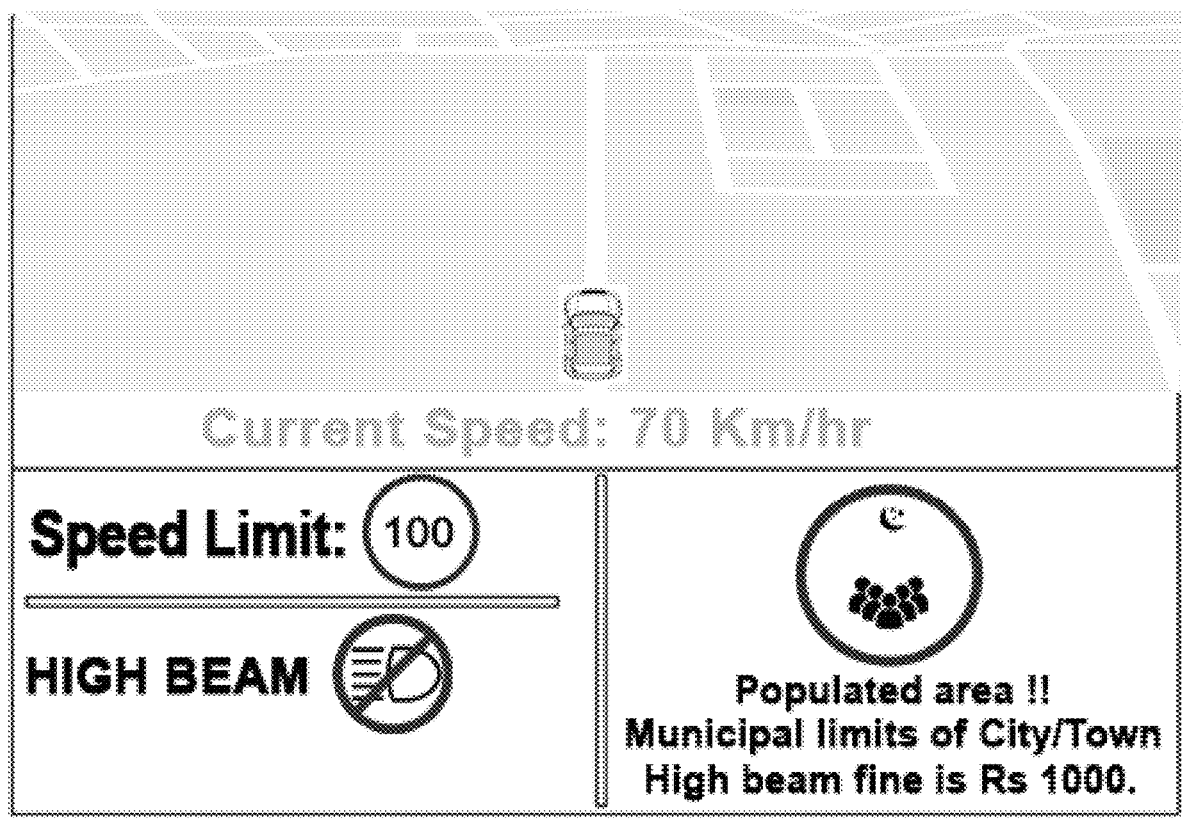

FIG. 12G gives screen display format when vehicle is in given geographical area having:
  a) Populated area/municipal limits of city/town ahead.
  b) Traffic rule to keep the Headlight beam in "Low" as a populated area is nearby.
  c) Speed limit is 100 km/hr.

Screen display gives visual display of numerical value of current speed i.e. 70 km/hr (green color) and speed limit as per local traffic rule is 100 km/hr. It means vehicle is moving with safe speed as per local traffic rules.

Screen display also gives symbol of prohibition (i.e. red colour circle with inclined line at 45°) for high beam as a populated area is ahead.

Screen also displays warning about populated area nearby information as "Populated area!! Municipal limits of Chandigarh!!" with an image of people in red color circle which means populated area.

Audio warnings will also accompany the video display so that a user can listen to warning/information without looking at the PDA screen i.e. without losing focus from road ahead.

Figure 12H:
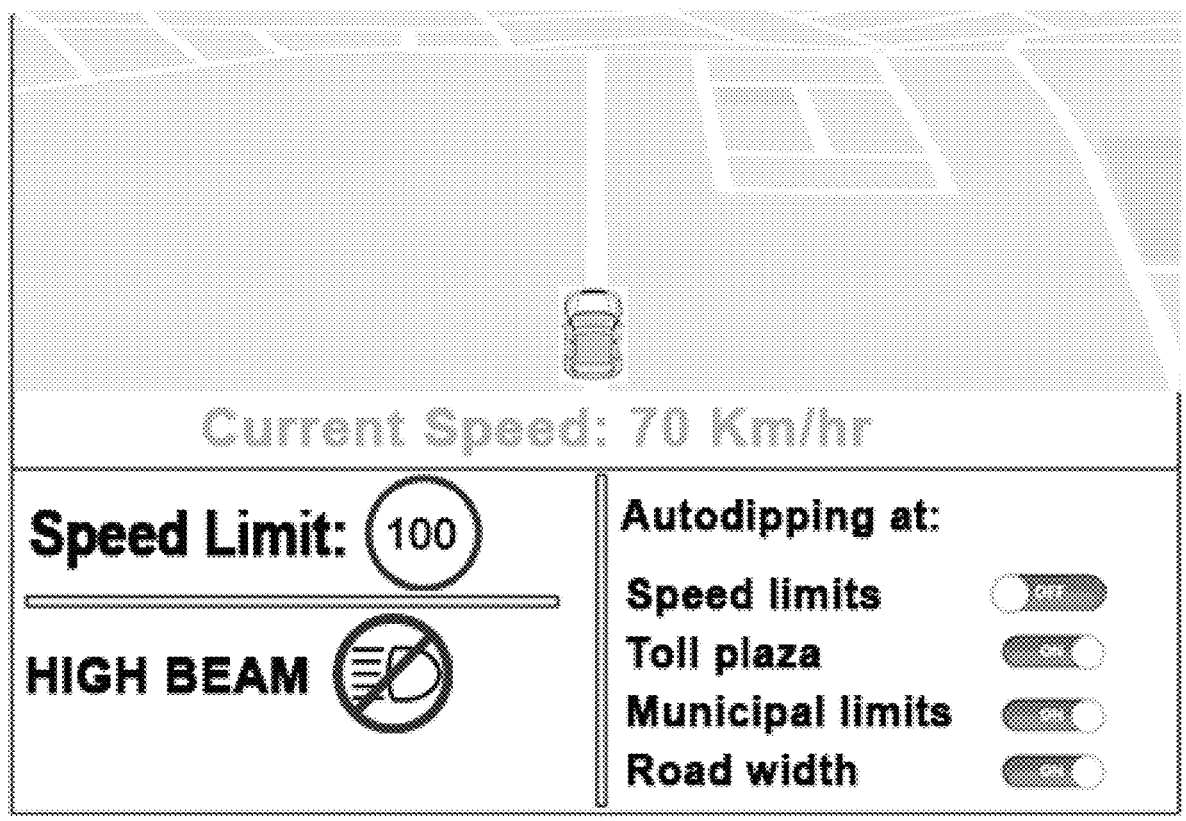

FIG. 12H gives screen display format when vehicle is in given geographical area and where a user can keep auto-dipping function enable or disable with the given checks:
  a) "Speed limit" check
  b) "Toll plaza" check
  c) "Municipal limits" check
  d) "Road width" check Screen display gives visual display of numerical value of current speed i.e. 70 km/hr (green color) and speed limit as per local traffic rule is 100 km/hr. It means vehicle is moving with safe speed as per local traffic rules.

Screen display also gives symbol of prohibition (i.e. red color circle with inclined line at 45°) for high beam as municipal limits of city/town are ahead.

Screen also displays various options to user to enable or disable various features which will decide whether to dip headlights beam automatically or not. E.g. speed limits check, toll plaza check, municipal limits check, road width check etc.

Enabling "speed limit" check feature will enable over-speed warning of the system and also enables the headlight dipping check as per various speed limits.

Disabling "speed limit" check feature will disable over-speed warning of the system and also disables the headlight dipping check as per various speed limits.

Enabling "toll plaza" check feature will enable toll plaza ahead warning of the system and also enables the headlight dipping check at toll plazas.

Disabling "toll plaza" check feature will disable toll plaza ahead warning of the system and also disables the headlight dipping check at toll plazas.

Enabling "Municipal limits" check feature will enable Municipal limits check and warning of the system and also enables the headlight dipping check in Municipal limits.

Disabling "Municipal limits" check feature will disable Municipal limits check and warning of the system and also disables the headlight dipping check in Municipal limits.

Enabling "road width" check feature will enable road width check and warning of the system and also enables the headlight dipping check as per current width of road.

Disabling "road width" check feature will disable road width check and warning of the system and also disables the headlight dipping check as per current width of road.

Audio warnings will also accompany the video display so that a user can listen to warning/information without looking at the PDA screen i.e. without losing focus from road ahead.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although implementations for a system for controlling headlamps of a vehicle and a method thereof have been described in language specific to structural features and/or methods, it is to be understood that the appended claims are not necessarily limited to the specific features or methods described. Rather, the specific features and methods are disclosed as examples of implementations for a system for controlling headlamps of a vehicle and a method thereof.

The invention claimed is:

1. A system for controlling headlamp beam of a vehicle, the system 500 comprising:
  a signal processing unit 509;
  a relay circuit 401 capable to perform action based on the signal from the signal processing unit;
  a switch 302;
  a user device 407 comprising:
    a Global Positioning System (GPS) 408-A tracker capable to receive signals;
  an output unit;
    a processor 408-B; and
    a memory 408-C coupled with the processor 408-A, wherein the processor 408-A is capable of executing programmed instructions stored in the memory 408-C for:

comparing one or more parameters with the predefined threshold value based upon traffic management guidelines and motor vehicle guidelines associated with the received signals, wherein the one or more parameters comprises speed limit of vehicle in the geographical area, traffic rules, turning point, blind spot, municipal limits of the geographical area, headlamp dipping rules, and penalty for violating the rules;

providing a notification signal to the user, wherein the notification signal is indicative of at least one of the information of the one or more parameters, and an instruction to change the status of the headlamp using the switch 302 based upon the comparison of the one or more parameters with the predefined threshold value;

controlling the status of the headlamps by
- operating the switch 302 in response to a command received from the user based upon the notification signal, or
- automatically operating the relay circuit 401 to trigger the operation of the switch 302 after failure of receipt of the command from the user to operate the switch 302 within a predefined time period from the notification signal.

2. The system of claim 1, wherein the signal processing unit 509 comprises an encoder 501, a RF transmitter 502, one or more antenna (503, 505), a RF receiver 506, a decoder 507 and a signal manipulator 508.

3. The system of claim 2, wherein the signal processing unit 509 is capable to process the signals received from the GPS tracker 408-A of the user device 407 through a communication medium.

4. The system of claim 1, wherein the output unit of the user device 407 is capable to provide output in various forms comprises at least one of an audio output, a video output and an audio video output.

5. The system of claim 1, wherein the signal received by the GPS tracker 408-A are associated with at least one of a geographical area, road width, traffic on the geographical area, a toll plaza situated on the geographical area.

6. The system of claim 1, wherein upon receiving inputs for enabling or disabling one or more parameters from the user, the processor 408-B is configured to enable or disable the notification for the one or more parameters.

7. A method for controlling headlamp beam of automobile, the method comprising:
   comparing, via a processor 408-B, one or more parameters with the predefined threshold value based upon traffic management guidelines and motor vehicle guidelines associated with the received signals, wherein the one or more parameters comprises speed limit of vehicle in the geographical area, traffic rules, turning point, blind spot, municipal limits of the geographical area, headlamp dipping rules, and penalty for violating the rules;

providing, via the processor 408-B, a notification signal to the user, wherein the notification signal is indicative of at least one of the information of the one or more parameters, and an instruction to change the status of the headlamp using the switch 302 based upon the comparison of the one or more parameters with the predefined threshold value and/or combination thereof;

controlling, via the processor 408-B, the status of the headlamps by
   - operating the switch 302 in response to a command received from the user based upon the notification signal, or
   - automatically operating the relay circuit 401 to trigger the operation of the switch 302 after failure of receipt of the command from the user to operate the switch 302 within a predefined time period from the notification signal.

* * * * *